US012771496B2

(12) United States Patent
Patchava et al.

(10) Patent No.: US 12,771,496 B2
(45) Date of Patent: Oct. 20, 2026

(54) ORTHOGONAL TIME FREQUENCY SPACE INDEX MODULATION USING A SELECTION OF SUBBLOCKS

(71) Applicant: QUALCOMM Incorporated, San Diego, CA (US)

(72) Inventors: Raviteja Patchava, San Diego, CA (US); Xiaoxia Zhang, San Diego, CA (US); Iyab Issam Sakhnini, San Diego, CA (US); Jun Ma, San Diego, CA (US); Morteza Soltani, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 533 days.

(21) Appl. No.: 18/166,289

(22) Filed: Feb. 8, 2023

(65) Prior Publication Data

US 2024/0267171 A1 Aug. 8, 2024

(51) Int. Cl.
*H04L 5/00* (2006.01)
*H04L 27/26* (2006.01)
*H04W 8/24* (2009.01)

(52) U.S. Cl.
CPC ........ *H04L 5/0023* (2013.01); *H04L 27/2601* (2013.01); *H04W 8/24* (2013.01)

(58) Field of Classification Search
CPC ................ H04L 27/26; H04L 27/2601; H04L 5/0007; H04L 5/0023; H04L 5/0094; H04W 8/24
USPC ........................................................ 370/329
See application file for complete search history.

(56) References Cited

U.S. PATENT DOCUMENTS

| | | | | |
|---|---|---|---|---|
| 2006/0200722 A1* | 9/2006 | Braun | H04L 1/0013 | 714/748 |
| 2007/0140101 A1* | 6/2007 | Guo | H04L 27/2618 | 370/204 |
| 2009/0092195 A1* | 4/2009 | Guo | H04L 27/2624 | 375/260 |
| 2015/0382336 A1* | 12/2015 | Zhang | H04L 1/1812 | 370/329 |
| 2017/0064705 A1* | 3/2017 | Lee | H04L 1/0026 | |
| 2017/0118701 A1* | 4/2017 | Kim | H04W 48/20 | |
| 2017/0180032 A1* | 6/2017 | Basar | H04B 7/0495 | |
| 2017/0332264 A1* | 11/2017 | Mo | H04W 24/08 | |

(Continued)

OTHER PUBLICATIONS

Sumer, Ahmet, et al. "Exploiting OTFS Frame Structure for PAPR Reduction" 2022 IEEE 96th Vehicular Technology Conference (Year: 2022).*

(Continued)

*Primary Examiner* — Stephen J Clawson
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may transmit capability signaling indicating that orthogonal time frequency space index modulation (OTFS-IM) is supported by the UE. The UE may receive, based at least in part on the capability signaling, an indication of a subblock size of a subblock and an index modulation pattern associated with the subblock for the OTFS-IM. The UE may perform a communication based at least in part on the indication of the subblock size and the index modulation pattern for the OTFS-IM. Numerous other aspects are described.

30 Claims, 15 Drawing Sheets

(56) References Cited

U.S. PATENT DOCUMENTS

| | | | | |
|---|---|---|---|---|
| 2018/0084447 | A1* | 3/2018 | Seo | H04L 1/00 |
| 2018/0092085 | A1* | 3/2018 | Shaheen | H04W 36/0094 |
| 2018/0115382 | A1* | 4/2018 | Manolakos | H04B 7/066 |
| 2019/0230499 | A1* | 7/2019 | Sun | H04L 1/1887 |
| 2020/0396038 | A1* | 12/2020 | Qaraqe | H04L 5/0044 |
| 2021/0314097 | A1* | 10/2021 | Osawa | H04L 1/1864 |
| 2022/0123890 | A1* | 4/2022 | Sakhnini | H04L 5/0048 |
| 2022/0393921 | A1* | 12/2022 | Pfadler | H04L 25/0224 |
| 2023/0319708 | A1* | 10/2023 | Ma | H04W 8/24 455/574 |
| 2023/0327827 | A1* | 10/2023 | Patchava | H04L 5/0046 370/329 |
| 2024/0129009 | A1* | 4/2024 | Li | H04L 27/26025 |
| 2024/0214170 | A1* | 6/2024 | Gong | H04L 5/0085 |

OTHER PUBLICATIONS

International Search Report and Written Opinion—PCT/US2024/010563—ISA/EPO—Apr. 25, 2024.

Li S., et al., "Spatial Multiplexing Aided OTFS With Index Modulation", IEEE Transactions on Vehicular Technology, IEEE, USA, vol. 72, No. 6, Feb. 6, 2023, pp. 8192-8197, XP011943575, sections I-III.

Ren H., et al., "Orthogonal Time-Frequency Space with Improved Index Modulation", 2021 15th International Conference on Signal Processing and Communication Systems (ICSPCS), IEEE, Dec. 13, 2021, 6 Pages, XP034064114, Abstract, sections I-IV.

* cited by examiner

ORTHOGONAL TIME FREQUENCY SPACE INDEX MODULATION USING A SELECTION OF SUBBLOCKS

FIELD OF THE DISCLOSURE

Aspects of the present disclosure generally relate to wireless communication and to techniques and apparatuses for orthogonal time frequency space index modulation (OTFS-IM) using a selection of subblocks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to transmit capability signaling indicating that orthogonal time frequency space index modulation (OTFS-IM) is supported by the UE. The one or more processors may be configured to receive, based at least in part on the capability signaling, an indication of a subblock size of a subblock and an index modulation pattern associated with the subblock for the OTFS-IM. The one or more processors may be configured to perform a communication based at least in part on the indication of the subblock size and the index modulation pattern for the OTFS-IM.

Some aspects described herein relate to an apparatus for wireless communication at a network node. The apparatus may include a memory and one or more processors coupled to the memory. The one or more processors may be configured to receive capability signaling indicating that OTFS-IM is supported by a UE. The one or more processors may be configured to transmit, based at least in part on the capability signaling, an indication of a subblock size of a subblock and an index modulation pattern associated with the subblock for the OTFS-IM. The one or more processors may be configured to perform a communication based at least in part on the indication of the subblock size and the index modulation pattern for the OTFS-IM.

Some aspects described herein relate to a method of wireless communication performed by a UE. The method may include transmitting capability signaling indicating that OTFS-IM is supported by the UE. The method may include receiving, based at least in part on the capability signaling, an indication of a subblock size of a subblock and an index modulation pattern associated with the subblock for the OTFS-IM. The method may include performing a communication based at least in part on the indication of the subblock size and the index modulation pattern for the OTFS-IM.

Some aspects described herein relate to a method of wireless communication performed by a network node. The method may include receiving capability signaling indicating that OTFS-IM is supported by a UE. The method may include transmitting, based at least in part on the capability signaling, an indication of a subblock size of a subblock and an index modulation pattern associated with the subblock for the OTFS-IM. The method may include performing a communication based at least in part on the indication of the subblock size and the index modulation pattern for the OTFS-IM.

Some aspects described herein relate to a non-transitory computer-readable medium that stores a set of instructions for wireless communication by UE. The set of instructions, when executed by one or more processors of the UE, may cause the UE to transmit capability signaling indicating that OTFS-IM is supported by the UE. The set of instructions, when executed by one or more processors of the UE, may cause the UE to receive, based at least in part on the capability signaling, an indication of a subblock size of a subblock and an index modulation pattern associated with the subblock for the OTFS-IM. The set of instructions, when executed by one or more processors of the UE, may cause the UE to perform a communication based at least in part on the indication of the subblock size and the index modulation pattern for the OTFS-IM.

Some aspects described herein relate to a non-transitory computer-readable medium that stores a set of instructions for wireless communication by a network node. The set of instructions, when executed by one or more processors of the network node, may cause the network node to receive capability signaling indicating that OTFS-IM is supported by a UE. The set of instructions, when executed by one or more processors of the network node, may cause the network node to transmit, based at least in part on the capability signaling, an indication of a subblock size of a subblock and an index modulation pattern associated with the subblock for the OTFS-IM. The set of instructions, when executed by one or more processors of the network node, may cause the network node to perform a communication based at least in part on the indication of the subblock size and the index modulation pattern for the OTFS-IM.

Some aspects described herein relate to an apparatus for wireless communication. The apparatus may include means for transmitting capability signaling indicating that OTFS-IM is supported by the apparatus. The apparatus may include means for receiving, based at least in part on the capability signaling, an indication of a subblock size of a subblock and an index modulation pattern associated with the subblock for the OTFS-IM. The apparatus may include means for performing a communication based at least in part on the indication of the subblock size and the index modulation pattern for the OTFS-IM.

Some aspects described herein relate to an apparatus for wireless communication. The apparatus may include means for receiving capability signaling indicating that OTFS-IM is supported by a UE. The apparatus may include means for transmitting, based at least in part on the capability signaling, an indication of a subblock size of a subblock and an index modulation pattern associated with the subblock for the OTFS-IM. The apparatus may include means for performing a communication based at least in part on the indication of the subblock size and the index modulation pattern for the OTFS-IM.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
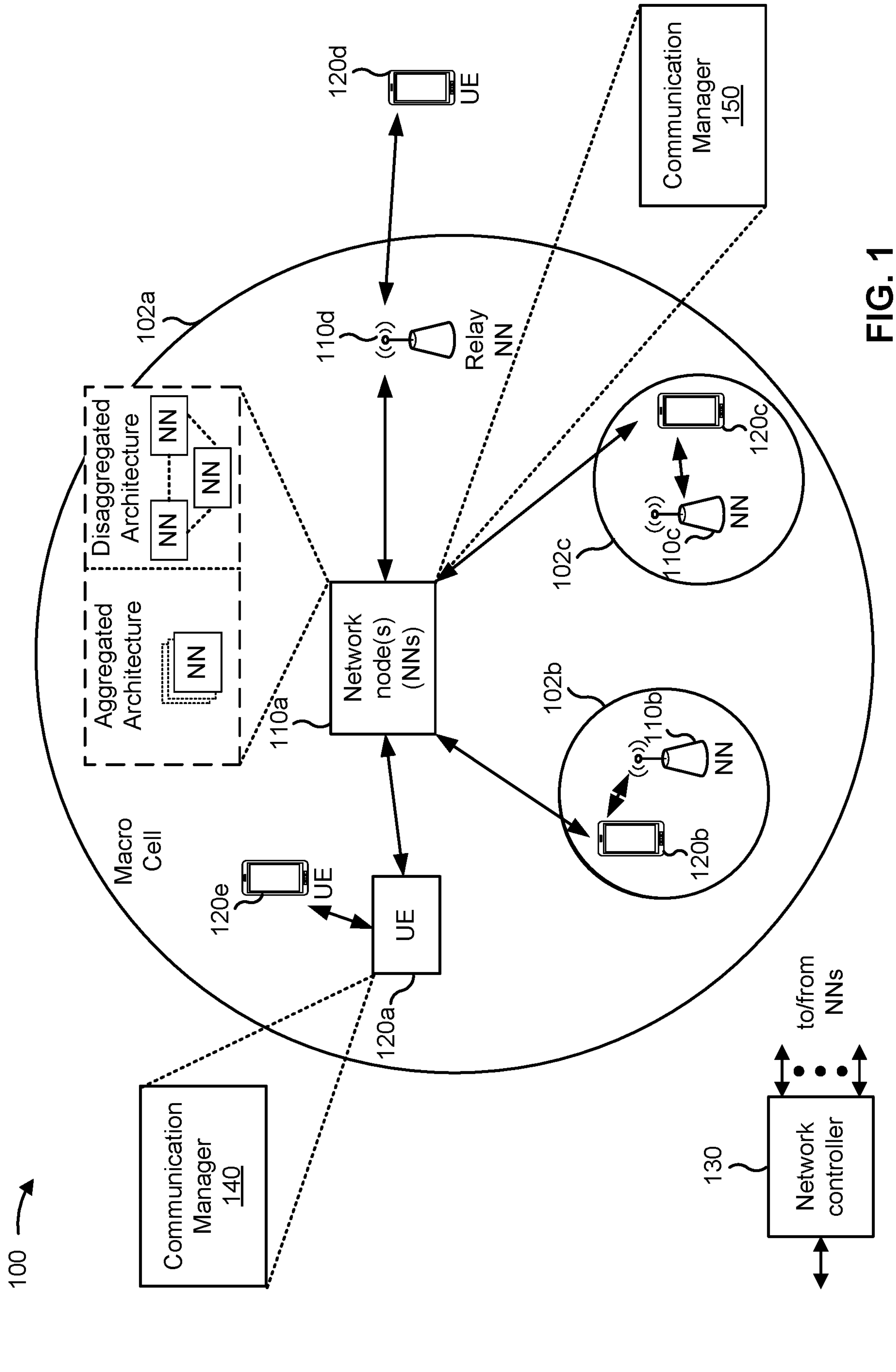
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device.

In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may transmit capability signaling indicating that orthogonal time frequency space index modulation (OTFS-IM) is supported by the UE; receive, based at least in part on the capability signaling, an indication of a subblock size of a subblock and an index modulation pattern associated with the subblock for the OTFS-IM; and perform a communication based at least in part on the indication of the subblock size and the index modulation pattern for the OTFS-IM. Additionally, or alternatively, the communication manager 140 may perform one or more other operations described herein.

In some aspects, a network node (e.g., network node 110) may include a communication manager 150. As described in more detail elsewhere herein, the communication manager 150 may receive capability signaling indicating that OTFS-IM is supported by a UE; transmit, based at least in part on the capability signaling, an indication of a subblock size of a subblock and an index modulation pattern associated with the subblock for the OTFS-IM; and perform a communication based at least in part on the indication of the subblock size and the index modulation pattern for the OTFS-IM. Additionally, or alternatively, the communication manager 150 may perform one or more other operations described herein.

As indicated above, FIG. 1 is provided as an example. Other examples may differ from what is described with regard to FIG. 1.

Figure 2:
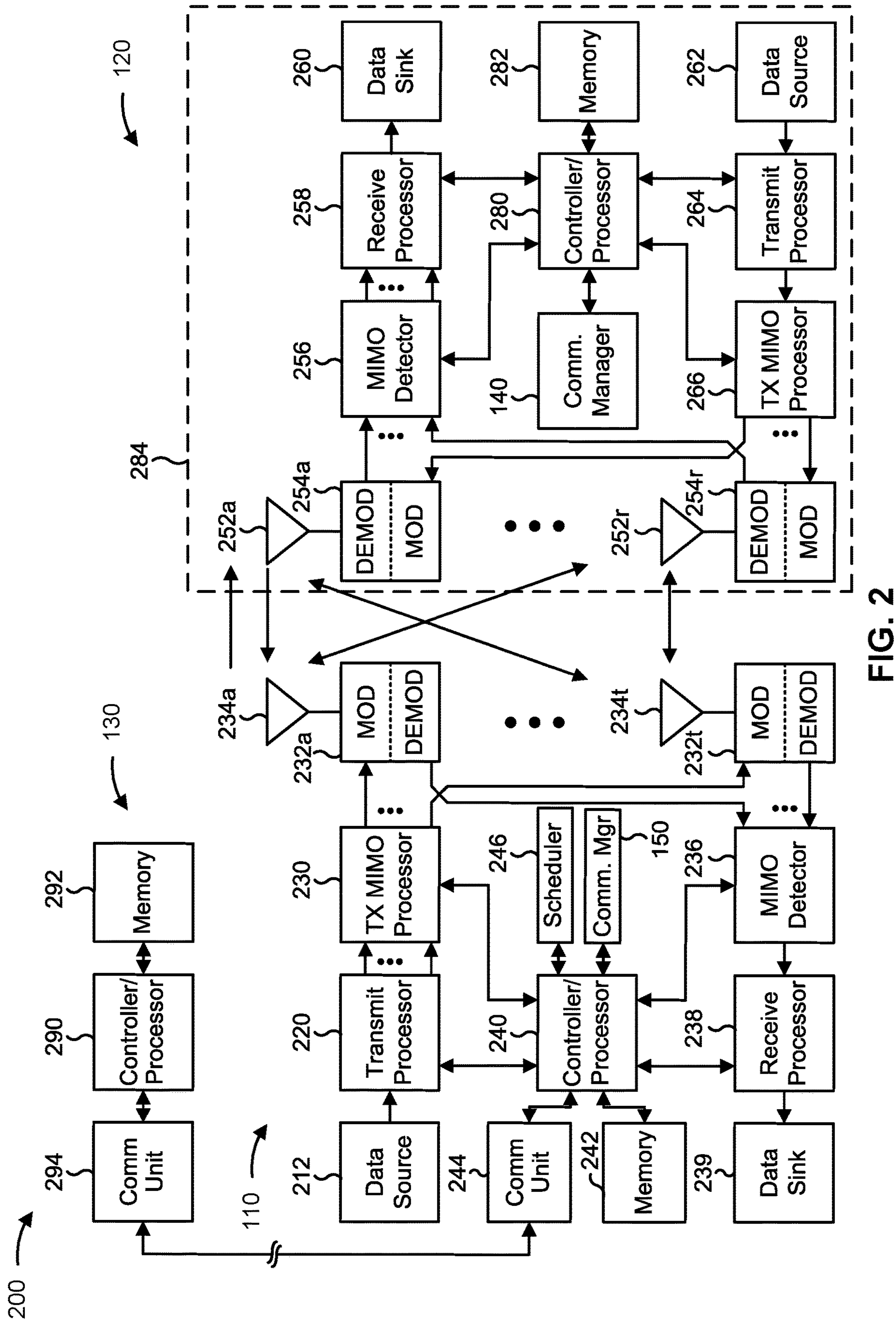
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-15).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-15).

The controller/processor 240 of the network node 110, the controller/processor 280 of the UE 120, and/or any other component(s) of FIG. 2 may perform one or more techniques associated with OTFS-IM using a selection of subblocks, as described in more detail elsewhere herein. For example, the controller/processor 240 of the network node 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, a UE (e.g., UE 120) includes means for transmitting capability signaling indicating that OTFS-IM is supported by the UE (e.g., using controller/processor 280, transmit processor 264, TX MIMO processor 266, modem 254, antenna 252, memory 282, or the like); means for receiving, based at least in part on the capability signaling, an indication of a subblock size of a subblock and an index modulation pattern associated with the subblock for the OTFS-IM (e.g., using antenna 252, modem 254, MIMO detector 256, receive processor 258, controller/processor 280, memory 282, or the like); and/or means for performing a communication based at least in part on the indication of the subblock size and the index modulation pattern for the OTFS-IM (e.g., using controller/processor 280, transmit processor 264, TX MIMO processor 266, modem 254, antenna 252, memory 282, or the like, or using antenna 252, modem 254, MIMO detector 256, receive processor 258, controller/processor 280, memory 282, or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for receiving capability signaling indicating that OTFS-IM is supported by a UE (e.g., using antenna 234, modem 232, MIMO detector 236, receive processor 238, controller/processor 240, memory 242, or the like); means for transmitting, based at least in part on the capability signaling, an indication of a subblock size of a subblock and an index modulation pattern associated with the subblock for the OTFS-IM (using controller/processor 240, transmit processor 220, TX MIMO processor 230, modem 232, antenna 234, memory 242, or the like); and/or means for performing a communication based at least in part on the indication of the subblock size and the index modulation pattern for the OTFS-IM (e.g., using antenna 234, modem 232, MIMO detector 236, receive processor 238, controller/processor 240, memory 242, or the like, or using controller/processor 240, transmit processor 220, TX MIMO processor 230, modem 232, antenna 234, memory 242, or the like). The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an JAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
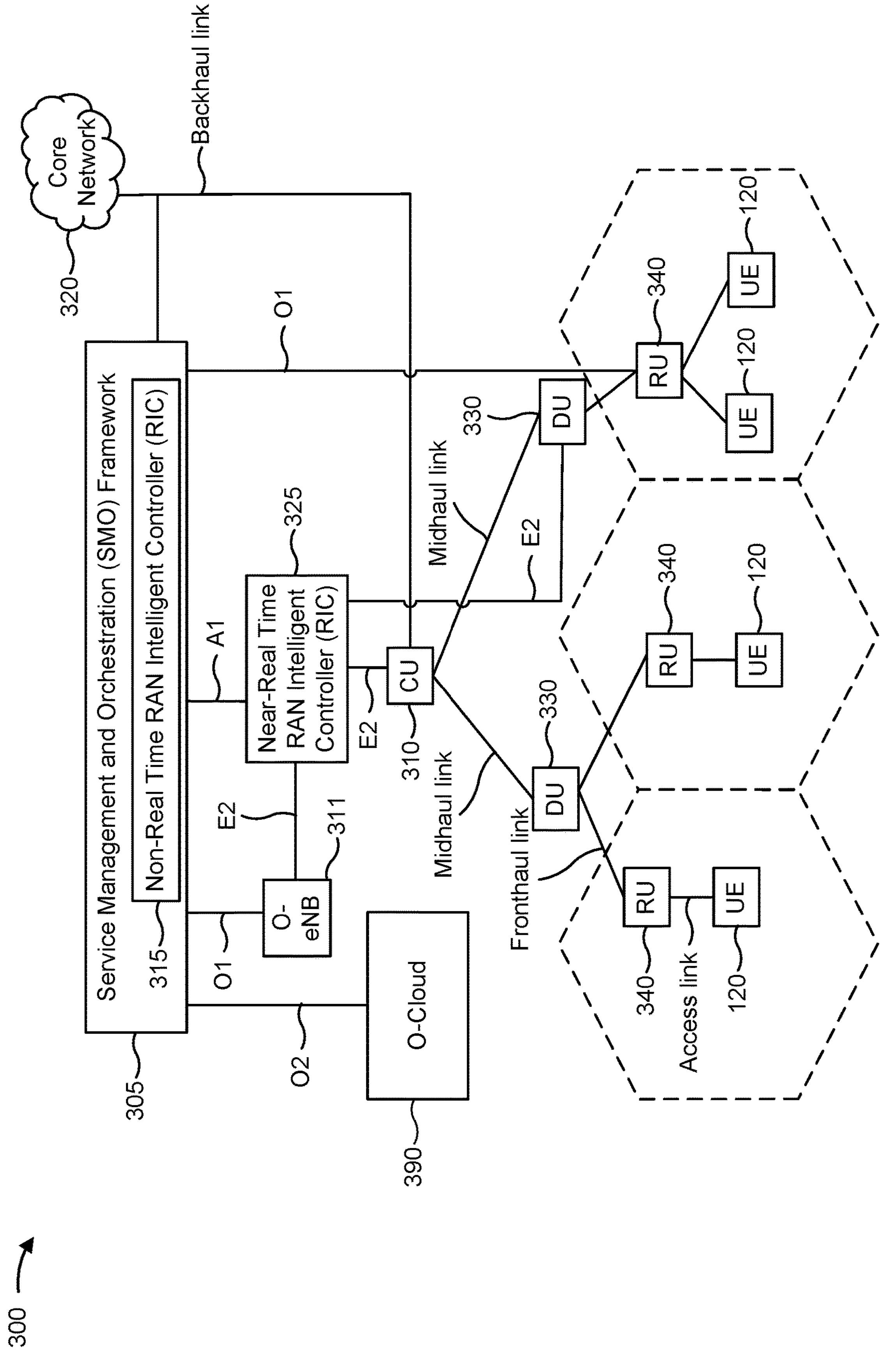
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

OTFS is a two-dimensional (2D) modulation technique that transforms information carried in a delay-Doppler coordinate system. The information in the delay-Doppler coordinate system may be transformed in a time-frequency domain, as utilized by traditional schemes of modulation, such as time division multiple access (TDMA), code division multiple access (CDMA), and orthogonal frequency division multiplexing (OFDM). OTFS is a waveform to handle high Doppler channels by transmitting in the delay-Doppler domain. In OTFS, a 2D discrete Fourier transform (DFT) (2D-DFT) precoding may be applied on information symbols which are present in the delay-Doppler domain, where such information symbols may be later mapped to the time-frequency domain.

Index modulation (IM) schemes for OFDM (OFDM-IM) may be used to improve the performance of OFDM. In OFDM-IM, sub-carriers may be split into subblocks, and IM may be implemented for each subblock. Similarly, IM may be used to improve the performance of OTFS. In OTFS-IM, a delay-Doppler grid may be split into subblocks, and IM may be implemented for each subblock.

Figure 4:
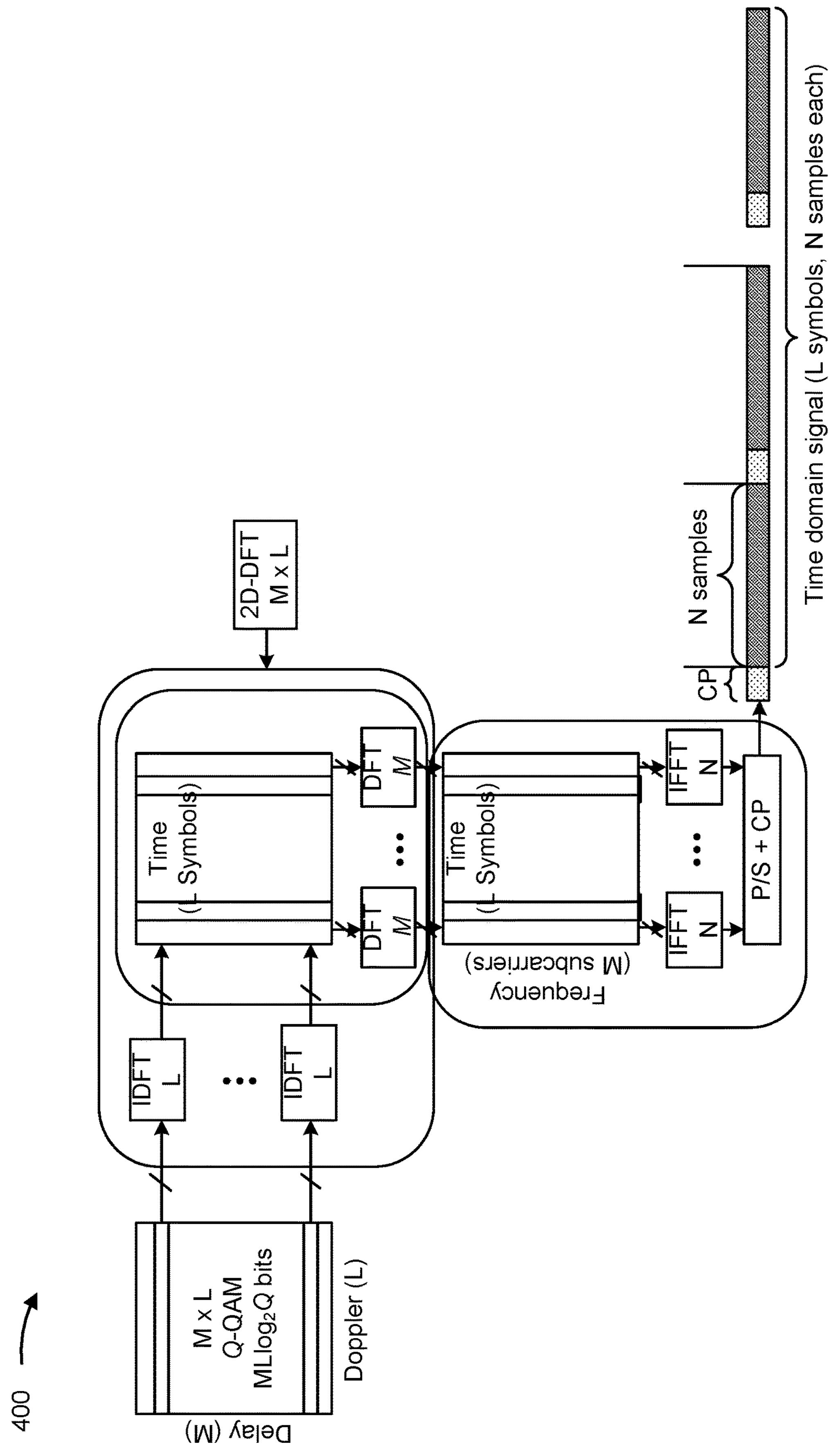
FIG. 4 is a diagram illustrating an example of an orthogonal time frequency space (OTFS) technique at a transmitter, in accordance with the present disclosure.

FIG. 4 is a diagram illustrating an example 400 of an OTFS technique at a transmitter, in accordance with the present disclosure.

As shown in FIG. 4, in an OTFS waveform at a transmitter, delay-Doppler information symbols may be represented by M×L Q-QAM ML $\log_2 Q$ bits, where M is associated with a delay domain and L is associated with a Doppler domain. The delay-Doppler information symbols may be converted to a time-frequency domain using 2D-DFT, which may involve applying inverse DFT (IDFT) L and applying DFT M to the delay-Doppler information symbols. Converting the delay-Doppler information symbols to the time-frequency domain using the 2D-DFT may result in a time-frequency domain signal. A time domain may be associated with L symbols, and a frequency domain may be associated with M subcarriers. Symbols at an output of a D2-DFT transform may represent the time-frequency domain. An inverse fast Fourier transform (IFFT) may be applied (e.g., IFFT N) to the time-frequency domain signal, which may result in a time domain signal. In other words, the IFFT may be applied to obtain the time domain signal.

The time domain signal may be associated with L symbols, with N samples in each symbol, where L may depend on a geometric coherence time and latency. The geometric coherence time is the time duration during which the scatters and the Doppler shift remain constant. The geometric coherence time may depend on a velocity, an angle of arrival (AoA), and/or an angle of departure (AoD). For example, L may be selected as 14 in the case of slot-based OTFS transmission.

As indicated above, FIG. 4 is provided as an example. Other examples may differ from what is described with regard to FIG. 4.

In OTFS, an input signal may be associated with a delay-Doppler domain. An output signal may be based at least in part on the input signal and the channel. The OTFS input-output relation when the channel is a delay-Doppler channel may be a 2D twisted convolution with varying phase shifts. Due to the under-spread nature, the channel may occupy only a small fraction (around the origin) of the delay-Doppler grid.

Figure 5:
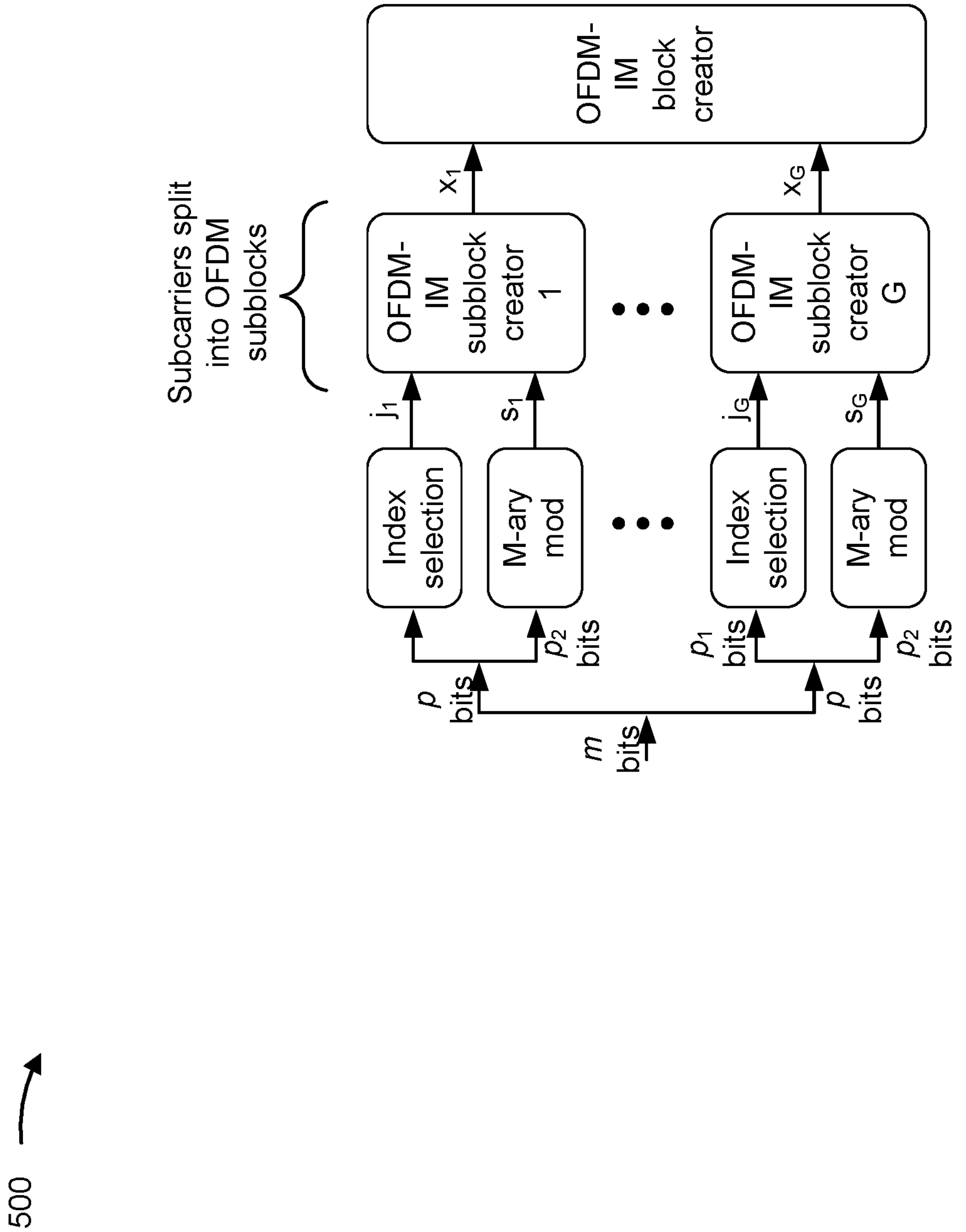
FIG. 5 is a diagram illustrating an example of orthogonal frequency division multiplexing index modulation (OFDM-IM), in accordance with the present disclosure.

FIG. 5 is a diagram illustrating an example 500 of OFDM-IM, in accordance with the present disclosure.

As shown in FIG. 5, in OFDM-IM, subcarriers may be split into OFDM subblocks at a transmitter (e.g., using OFDM-IM subblock creator 1 to OFDM-IM subblock creator G, where the OFDM-IM subblock creator 1 may be based at least in part on an index selection and an M array modulation). The index selection may decide a non-zero's position in an OFDM subblock. In each OFDM subblock, k out of L subcarriers (k<L) are mapped by the constellation alphabet M, and the other (L–k) subcarriers are kept empty. Further, $$p_1 = \left\lfloor \log_2\binom{L}{k} \right\rfloor \text{ bits, } p_2 = k\log_2 M$$

bits, and $$SE_{OFDM-IM} = \frac{1}{L}\left(k\log_2 M + \left\lfloor \log_2\binom{L}{k} \right\rfloor\right)$$

bits per subcarrier, where k and L may be selected to maximize the spectral efficiency (SE) and the energy efficiency.

As indicated above, FIG. 5 is provided as an example. Other examples may differ from what is described with regard to FIG. 5.

Figure 6:
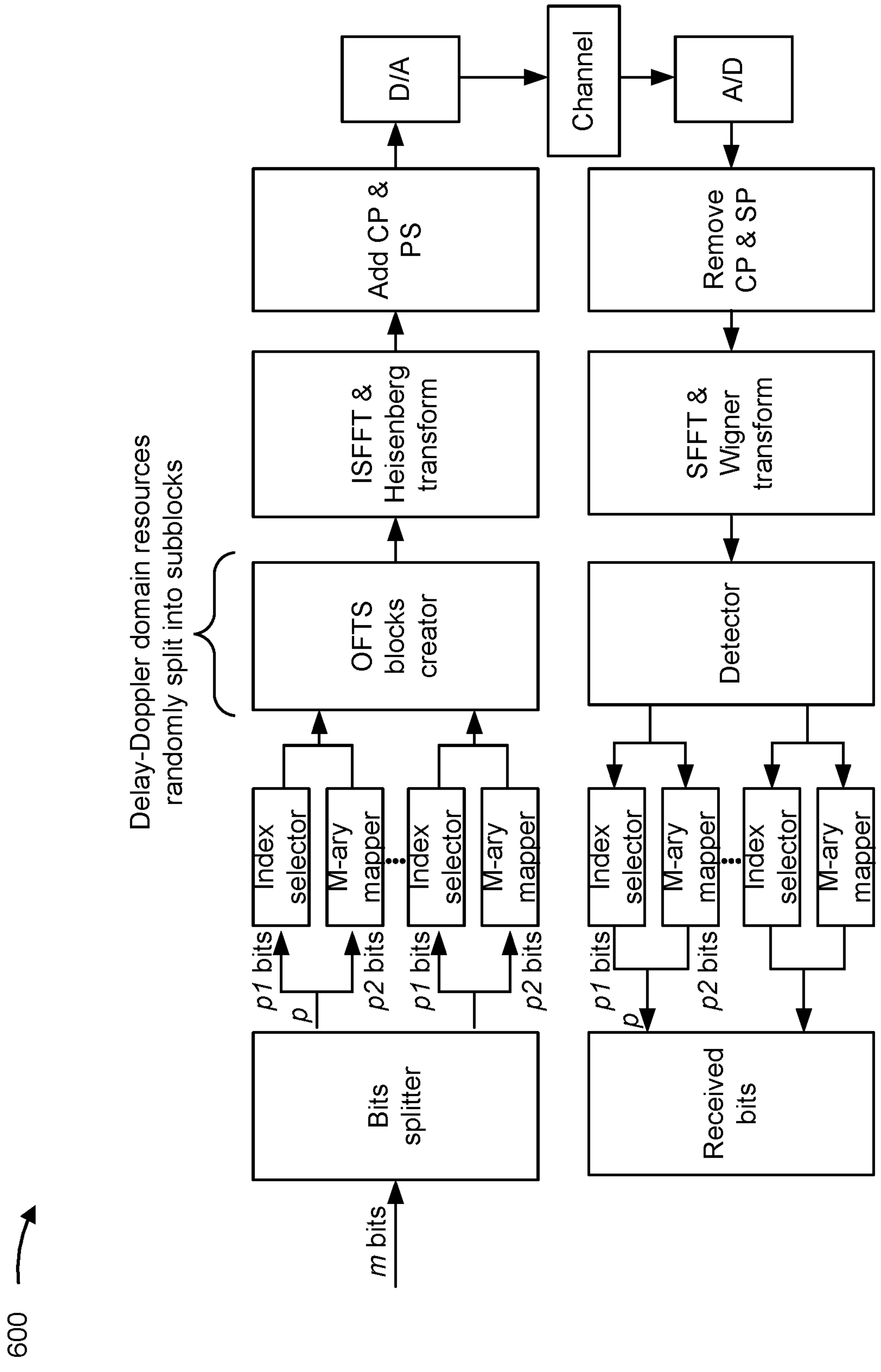
FIG. 6 is a diagram illustrating an example of OTFS index modulation (OTFS-IM), in accordance with the present disclosure.

FIG. 6 is a diagram illustrating an example 600 of OTFS-IM, in accordance with the present disclosure.

As shown in FIG. 6, in OTFS-IM, delay-Doppler domain resources may be randomly split into subblocks at a transmitter (e.g., using an OTFS block creator, which may occur after a bits splitting, an index selection, and an M array mapper). In each subblock, k out of L resources (k<L) are mapped by the constellation alphabet M, where $$SE_{OTFS-IM} = \frac{1}{L}\left(k\log_2 M + \left\lfloor \log_2\binom{L}{k} \right\rfloor\right)$$

bits/resource, and k and L may be selected to maximise the spectral efficiency and the and energy efficiency.

The OTFS block creator may be followed by an inverse symplectic FFT (ISFFT) and Heisenberg transform, a cyclic prefix (CP) addition, a parallel-to-serial (PS) conversion, and a digital-to-analog (D/A) conversion. The transmitter may transmit a resulting signal over a channel, where the signal may be received by a receiver. The receiver may perform an analog-to-digital (A/D) conversion, a CP removal, a serial-to-parallel (SP) conversion, a symplectic FFT (SFFT) and Wigner transform, and a detection. The receiver may further perform an index demapping and an M array demapping to obtain received bits.

As indicated above, FIG. 6 is provided as an example. Other examples may differ from what is described with regard to FIG. 6.

In OTFS-IM, the delay-Doppler grid may be split into subblocks, but the subblock selection may be considered as random and does not follow a particular design, and thereby does not provide other benefits. In other words, randomly splitting the delay-Doppler grid into the subblocks does not provide other advantages, such as an improved peak-to-average power ratio (PAPR). Past solutions have not included splitting the delay-Doppler grid using a particular scheme that provides other benefits, such as the improved PAPR.

In various aspects of techniques and apparatuses described herein, a UE may transmit, to a network node, capability signaling indicating that OTFS-IM is supported by the UE. The capability signaling may further indicate a maximum subblock size supported by the UE. The UE may receive, from the network node and based at least in part on the capability signaling, an indication of a subblock size of a subblock and an index modulation pattern associated with the subblock for the OTFS-IM. The subblock size and the index modulation pattern may be based at least in part on a PAPR requirement and/or a data requirement. The subblock may be associated with a delay dimension and a Doppler dimension. The index modulation pattern may indicate a non-zero pattern (e.g., a pattern of 1s and 0s (ones and zeros)) associated with the subblock. The UE may perform, to the network node, a communication based at least in part on the indication of the subblock size and the index modulation pattern for the OTFS-IM. The UE, when performing the communication, may receive an OTFS-IM waveform based at least in part on the indication of the subblock size and the index modulation pattern for OTFS-IM, where the OTFS-IM may be detectable by the UE based at least in part on the indication of the subblock size and the index modulation pattern for OTFS-IM. The UE, when performing the communication, may transmit an OTFS-IM waveform based at least in part on the indication of the subblock size and the index modulation pattern for OTFS-IM.

In some aspects, in order to improve the performance of OTFS-IM, the subblocks in a delay-Doppler domain may be selected in a particular manner that yields other benefits, such as improved PAPR. The network node may select the subblocks in the delay-Doppler domain (e.g., the subblock size and the index modulation pattern), and may indicate the subblocks in the delay-Doppler domain to the UE. The UE may use such subblocks in the delay-Doppler domain, thereby benefiting from the improved PAPR. In other words, instead of using randomly selected subblocks, which do not provide any benefit in terms of the PAPR, the UE may use subblocks that are specifically selected by the network node to improve the PAPR.

Figure 7:
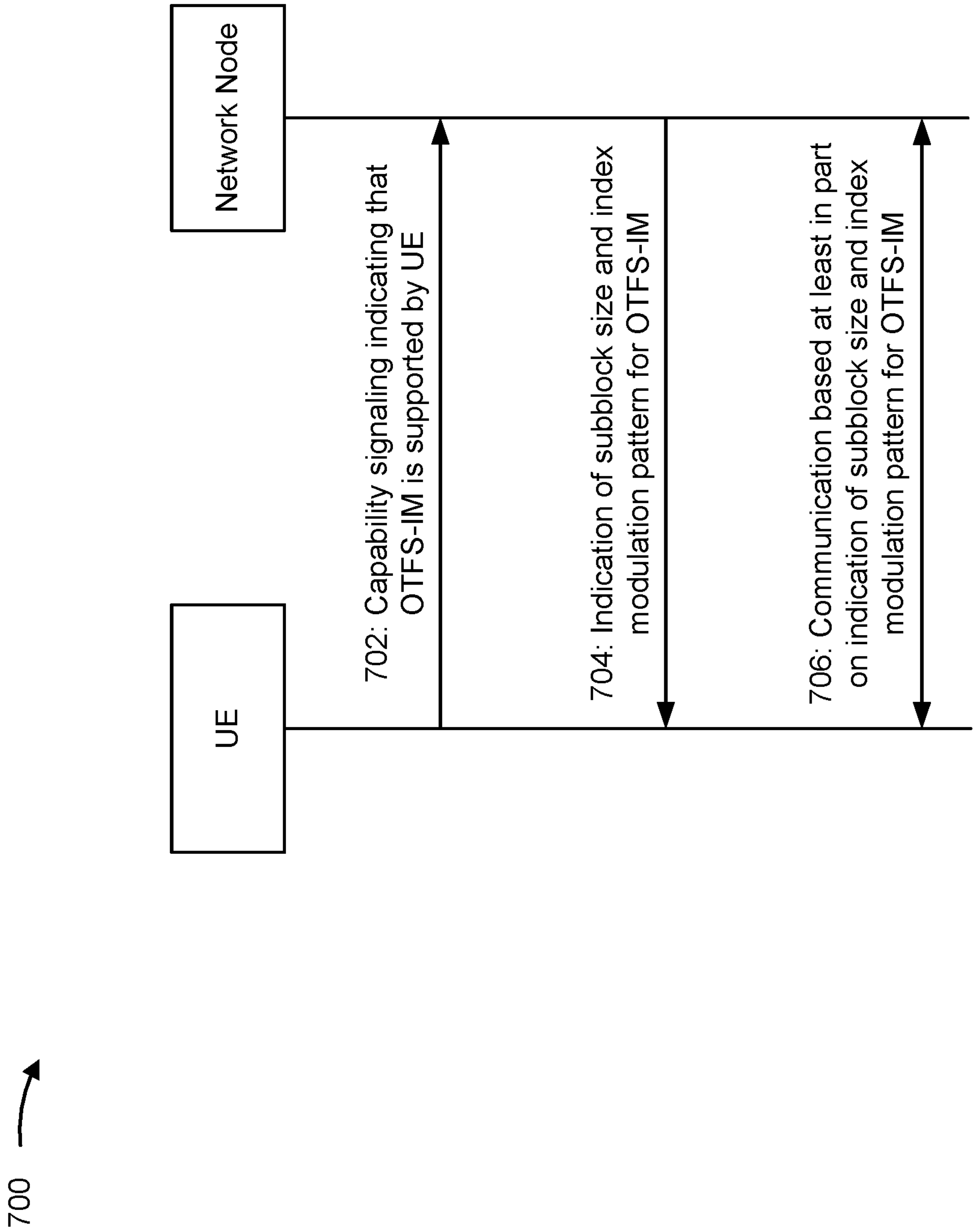
FIGS. 7-11 are diagrams illustrating examples associated with OTFS-IM using a selection of subblocks, in accordance with the present disclosure.

FIG. 7 is a diagram illustrating an example 700 associated with OTFS-IM using a selection of subblocks. As shown in FIG. 7, example 700 includes communication between a UE (e.g., UE 120) and a network node (e.g., network node 110). In some aspects, the ULE and the network node may be included in a wireless network, such as wireless network 100.

As shown by reference number 702, the UE may transmit, to the network node, capability signaling indicating that OTFS-IM is supported by the UE. The capability signaling may indicate a maximum subblock size supported by the UE. In other words, the UE may indicate its capability for OTFS-IM and the maximum subblock size that is detectable in OTFS-IM by the UE. The maximum subblock size that is supported by the UE may be based at least in part on a processing capability of the UE.

As shown by reference number 704, the UE may receive, from the network node and based at least in part on the capability signaling, an indication of a subblock size of a subblock and an index modulation pattern associated with the subblock for the OTFS-IM. The subblock size may be based at least in part on a PAPR requirement and/or a data requirement, which may be for the UE and/or the network node. The network node may select the subblock size and the index modulation pattern for OTFS-IM based at least in part on the PAPR requirement and the data requirement, and the network node may indicate the subblock size and the index modulation pattern to the UE. The data requirement may be based at least in part on a spectral efficiency and/or an energy efficiency. The index modulation pattern may also be based at least in part on the PAPR requirement and/or the data requirement. The subblock may be associated with a delay dimension and a Doppler dimension. The index modulation pattern may indicate a non-zero pattern associated with the subblock. In other words, the index modulation pattern may indicate a quantity of zeroes and/or a quantity of non-zeroes associated with the subblock.

In some aspects, the subblock size may be based at least in part on a modulation order. In other words, the subblock selection may be a function of the modulation order, which may impact the PAPR. For example, a lower modulation order may be associated with a lower subblock size, and a higher modulation order may be associated with a higher subblock size.

In some aspects, the subblock may be selected based at least in part on the Doppler dimension, where a plurality of Doppler resources corresponding to a delay may be selected as the subblock, and a quantity of resources in the subblock may be selected to be non-zero and remaining resources in the subblock may be selected to be zero. In some aspects, the network node may select the subblocks based at least in part on the Doppler dimension. The plurality of Doppler resources corresponding to the delay (e.g., all of the Doppler resources corresponding to each delay), with a subblock size of L, may be selected as the subblock. In each subblock, only k resources may be selected to be non-zero, and the remaining (L−k) resources may be kept empty. In some aspects, selecting the subblocks based at least in part on the Doppler dimension may improve a PAPR of an OTFS-IM waveform. The PAPR of OTFS may depend on the FFT in the Doppler dimension, and the (L−k) zeroes in the Doppler dimension may help with reducing the PAPR. Further, Doppler domain interference may be reduced due to zeroes in the Doppler domain. Further, a uniform power allocation may be provided in the delay domain (e.g., the power per each delay dimension may be the same), which may be helpful for the delay-time based equalizers for OTFS.

In some aspects, one of the plurality of Doppler resources corresponding to the delay may be selected to be non-zero. The network node may select one L Doppler resource per delay as non-zero (e.g., only one of the L Doppler resources per each delay may be selected to be non-zero), which may result in $$SE_{OTFS-IM} = \frac{1}{L}(k\log_2 M + \lfloor \log_2 L \rfloor)$$

bits/resource. For example, a first resource of the L Doppler resources per delay may be selected to be non-zero, while remaining resources of the L Doppler resources per delay may be zero. Since one resource may be non-zero in the L Doppler resources per delay, each delay symbol after an IDFT may contain the uniform power in time, which may result in the PAPR of OTFS being the same as in a DFT-s-OFDM waveform.

In some aspects, the subblock may be selected based at least in part on a plurality of Doppler resources corresponding to multiple delays, where a quantity of resources in the subblock may be selected to be non-zero and remaining resources in the subblock may be selected to be zero. In some aspects, the network node may select Doppler resources corresponding to multiple delays (e.g., all of the Doppler resources corresponding to multiple delays) as the subblock. In this case, the subblock may have a subblock size of mL, where m is the number of delays in each subblock. For example, Doppler resources corresponding to two delays (m=2) may be selected as a subblock. In each subblock, only k resources may be selected to be non-zeroes, and the remaining (L−k) resources may be kept empty. In some aspects, selecting the Doppler resources corresponding to the multiple delays as the subblock may result in a higher spectral efficiency for index modulation, as more resources may be selected as a subblock with a tradeoff in the PAPR. However, the PAPR may still be better as compared to a random selection of subblocks. A resulting spectral efficiency may be represented by $$SE_{OTFS-IM} = \frac{1}{L}\left(k\log_2 M + \left\lfloor \log_2 \binom{mL}{k} \right\rfloor\right)$$

bits/resource.

In some aspects, the subblock may be selected based at least in part on a plurality of delay resources corresponding to multiple Doppler resources, where a quantity of resources in the subblock may be selected to be non-zero and remaining resources in the subblock are selected to be zero. The network node may select delay resources corresponding to multiple Doppler resources (e.g., all of the delay resources corresponding to multiple Doppler resources) as the subblock. In this case, the subblock may have a subblock size of lM, where l is the number of Doppler resources in each subblock. For example, delay resources corresponding to two Doppler resources (l=2) may be selected as a subblock. In each subblock, only k resources may be selected to be non-zeroes, and the remaining (L−k) resources may be kept empty. In some aspects, selecting the delay resources corresponding to the multiple Doppler resources as the subblock may result in a higher spectral efficiency for index modulation, as more resources may be selected as a subblock with a tradeoff in the PAPR. A resulting spectral efficiency may be represented by $$SE_{OTFS-IM} = \frac{1}{L}\left(k\log_2 M + \left\lfloor \log_2 \binom{lM}{k} \right\rfloor\right)$$

In some aspects, the quantity of non-zero resources in each subblock may be varied (e.g., k may be varied for each subblock). The quantity of non-zero resources may vary across different subblocks. In a plurality of subblocks, the quantity of non-zero resources may be different between subblocks of the plurality of subblocks. For example, a first subblock may have 10 non-zero resources and a second subblock may have 8 non-zero resources. Alternatively, the quantity of non-zero resources in each subblock may be the same. In the plurality of subblocks, the quantity of non-zero resources may be the same between subblocks of the plurality of subblocks. In some aspects, zero resources in the subblock may be replaceable with a non-zero constellation, where the non-zero constellation may be different from a constellation used for non-zero resources in the subblock. The zero resources in each subblock may be replaced by the non-zero constellation, but the non-zero constellation may need to be different from the constellation used for the non-zero resources (e.g., the k resources). "Zero resources" refers to resources that are associated with values of "0", and does not refer to "no resources." In some aspects, index modulation may be performed on in-phase and quadrature (I/Q) components, where in each subblock, a fraction of the I/Q parts of the resources may be selected for modulation using pulse-amplitude modulation (PAM) separately. The index modulation may be applied separately for real parts of the resources and for imaginary parts of the resources, where the real parts may correspond to in-phase components and the imaginary parts may correspond to quadrature components, and where the real parts and the imaginary parts may be selected using different constellations.

As shown by reference number 706, the UE may perform, to the network node, a communication based at least in part on the indication of the subblock size and the index modulation pattern for the OTFS-IM. In some aspects, the UE may receive, from the network node, an OTFS-IM waveform in a downlink direction based at least in part on the indication of the subblock size and the index modulation pattern for OTFS-IM. The UE may be able to detect the OTFS-IM based at least in part on the indication of the subblock size and the index modulation pattern for OTFS-IM. In some aspects, the UE may transmit, to the network node, an OTFS-IM waveform in an uplink direction based at least in part on the indication of the subblock size and the index modulation pattern for OTFS-IM. The UE may be able to transmit the OTFS-IM waveform based at least in part on the indication of the subblock size and the index modulation pattern for OTFS-IM.

In some aspects, the subblock size may be a data subblock size (a subblock size for data) and the index modulation pattern may be a data index modulation pattern (an index modulation pattern for data). The network node may transmit, to the UE, a reference signal, which may indicate the subblock size and the index modulation pattern. In other words, the indication of the subblock size and the index modulation pattern may be communicated via the reference signal. The reference signal may be based at least in part on a reference signal subblock size (a subblock size for reference signals) and a reference signal index modulation pattern (an index modulation pattern for reference signals), which may be different from the data subblock size and the data index modulation pattern. In other words, reference signals versus data may be associated with different subblock sizes and different index modulation patterns. An indication of the reference signal subblock size and the reference signal index modulation pattern may be stored by the UE and used by the UE to detect the reference signal. The reference signal used to transmit the indication of the data subblock size and the data index modulation pattern may itself be index modulated, where the reference signal subblock size for the reference signal may be fixed and known to the UE. As a result, the UE may be able to detect the reference signal, and then be able to determine the data subblock size and the data index modulation pattern from the detected reference signal.

As indicated above, FIG. 7 is provided as an example. Other examples may differ from what is described with regard to FIG. 7.

Figure 8:
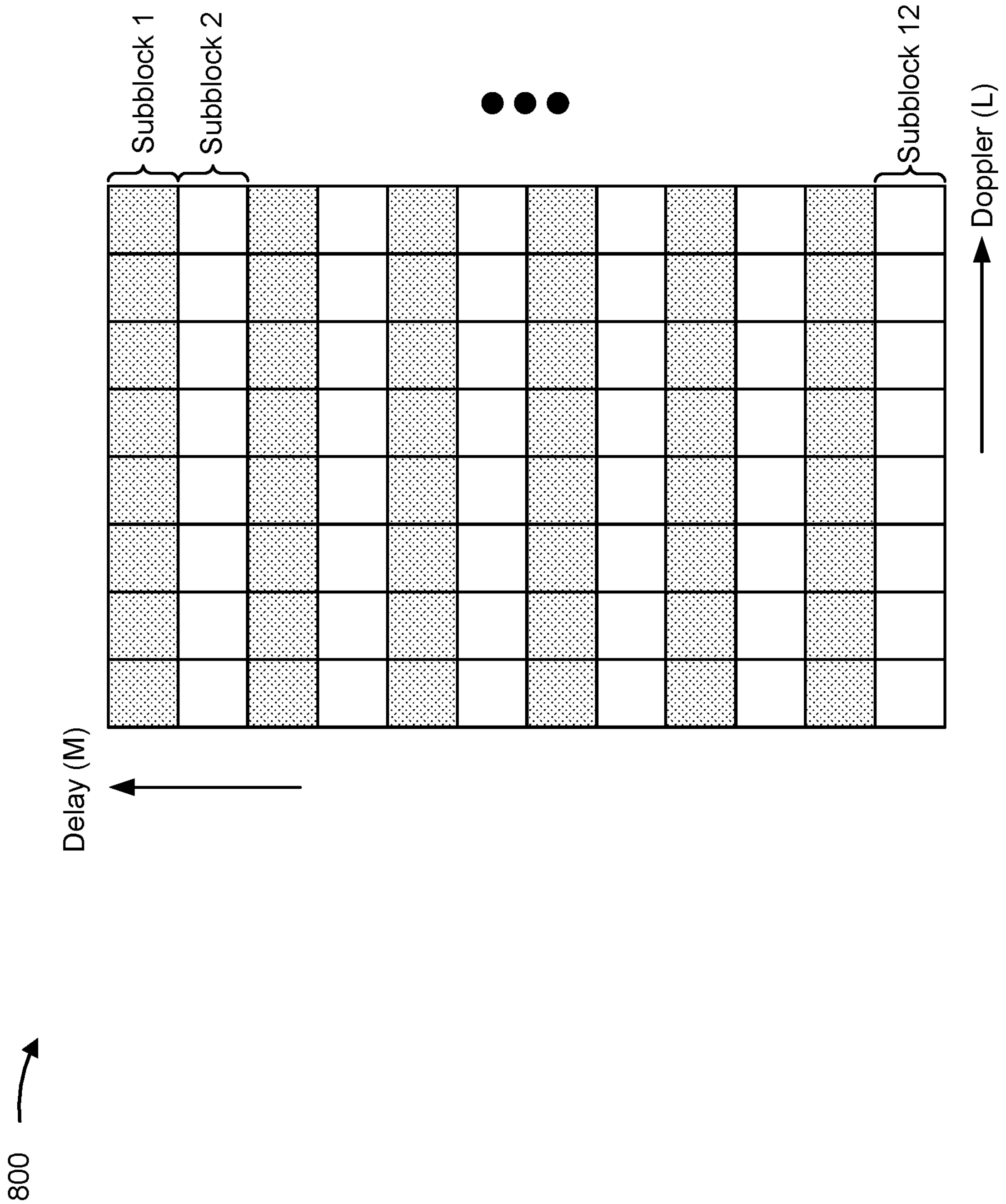

FIG. 8 is a diagram illustrating an example 800 associated with OTFS-IM using a selection of subblocks.

As shown in FIG. 8, subblocks may be selected based at least in part on the Doppler dimension. A plurality of Doppler resources corresponding to a delay (e.g., all of the Doppler resources corresponding to each delay), with a subblock size of L, may be selected as a subblock. In each subblock, only k resources may be selected to be non-zeroes, and the remaining (L−k) resources may be kept empty.

As indicated above, FIG. 8 is provided as an example. Other examples may differ from what is described with regard to FIG. 8.

Figure 9:
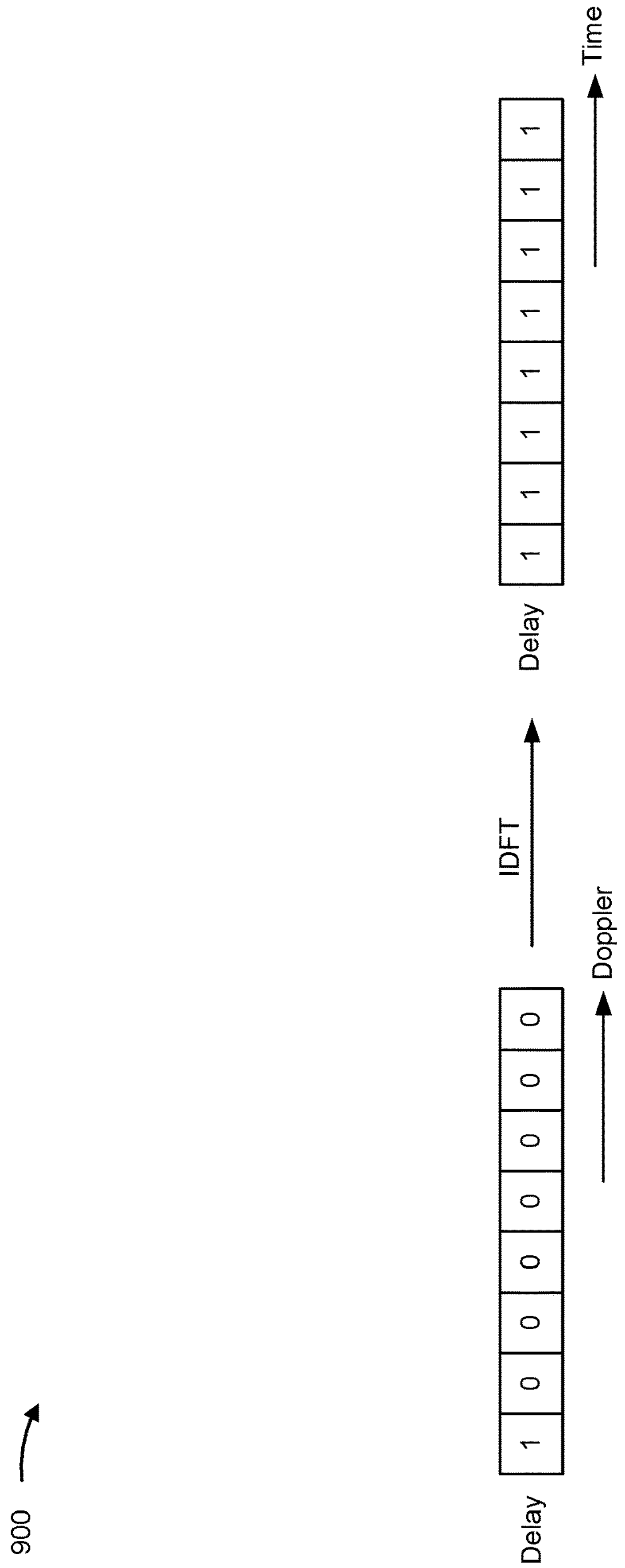

FIG. 9 is a diagram illustrating an example 900 associated with OTFS-IM using a selection of subblocks.

As shown in FIG. 9, one L Doppler resource per delay may be selected to be non-zero (e.g., only one of the L Doppler resources per each delay may be selected to be non-zero), which may result in $$SE_{OTFS-IM} = \frac{1}{L}(k\log_2 M + \lfloor \log_2 L \rfloor)$$

bits/resource. For example, a first resource of the L Doppler resources per delay may be selected to be non-zero, while remaining resources of the L Doppler resources per delay may be zero. Since one resource may be non-zero in the L Doppler resources per delay, each delay symbol after an IDFT may contain the uniform power in time, which may result in the PAPR of OTFS being the same as in a DFT-s-OFDM waveform.

As indicated above, FIG. 9 is provided as an example. Other examples may differ from what is described with regard to FIG. 9.

Figure 10:
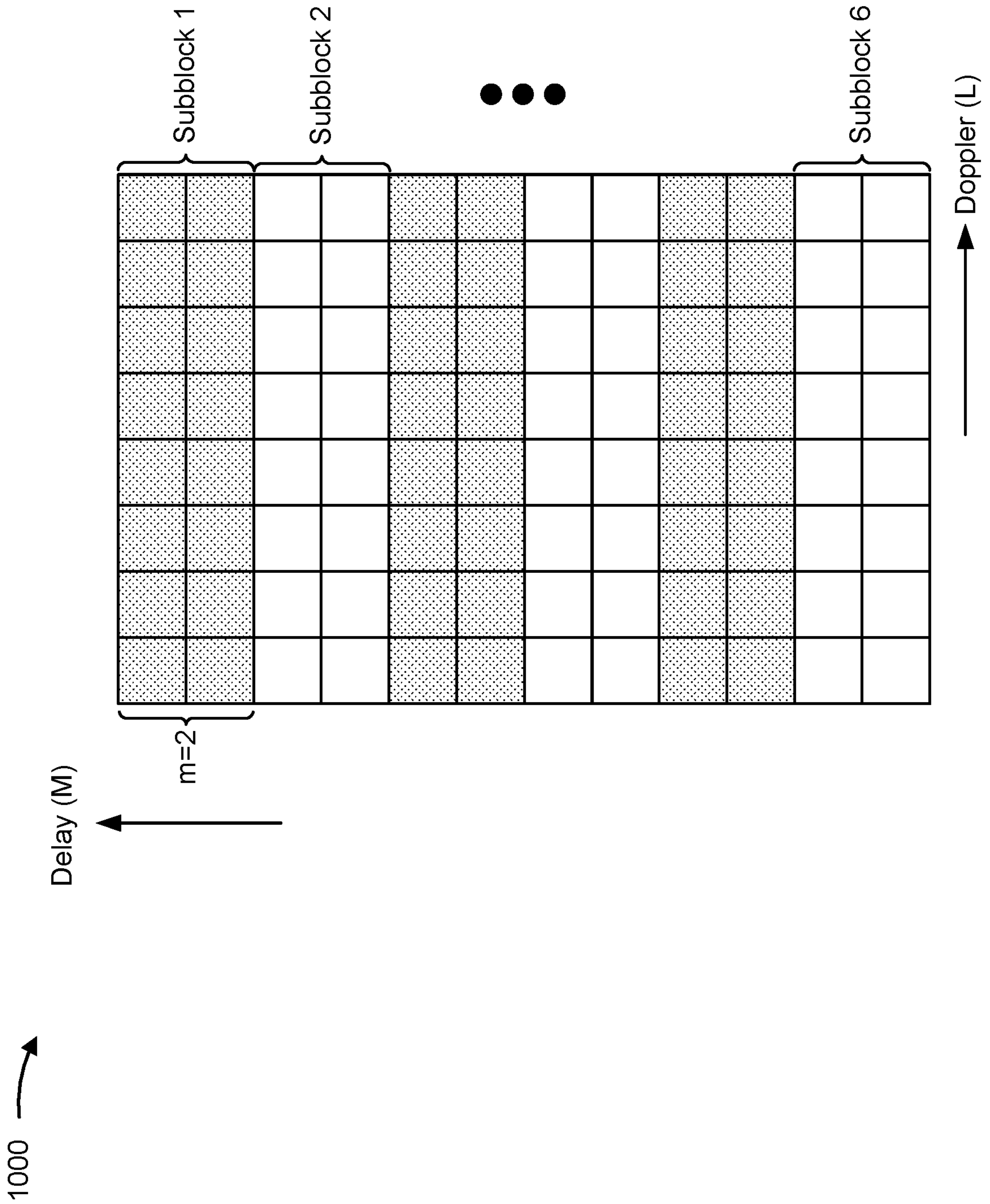

FIG. 10 is a diagram illustrating an example 1000 associated with OTFS-IM using a selection of subblocks.

As shown in FIG. 10, Doppler resources corresponding to multiple delays (e.g., all of the Doppler resources corresponding to multiple delays) may be selected as a subblock. In this case, a subblock may have a subblock size of mL, where m is the number of delays in each subblock. For example, Doppler resources corresponding to two delays (m=2) may be selected as a subblock. In each subblock, only k resources may be selected to be non-zeroes, and the remaining (L−k) resources may be kept empty.

As indicated above, FIG. 10 is provided as an example. Other examples may differ from what is described with regard to FIG. 10.

Figure 11:
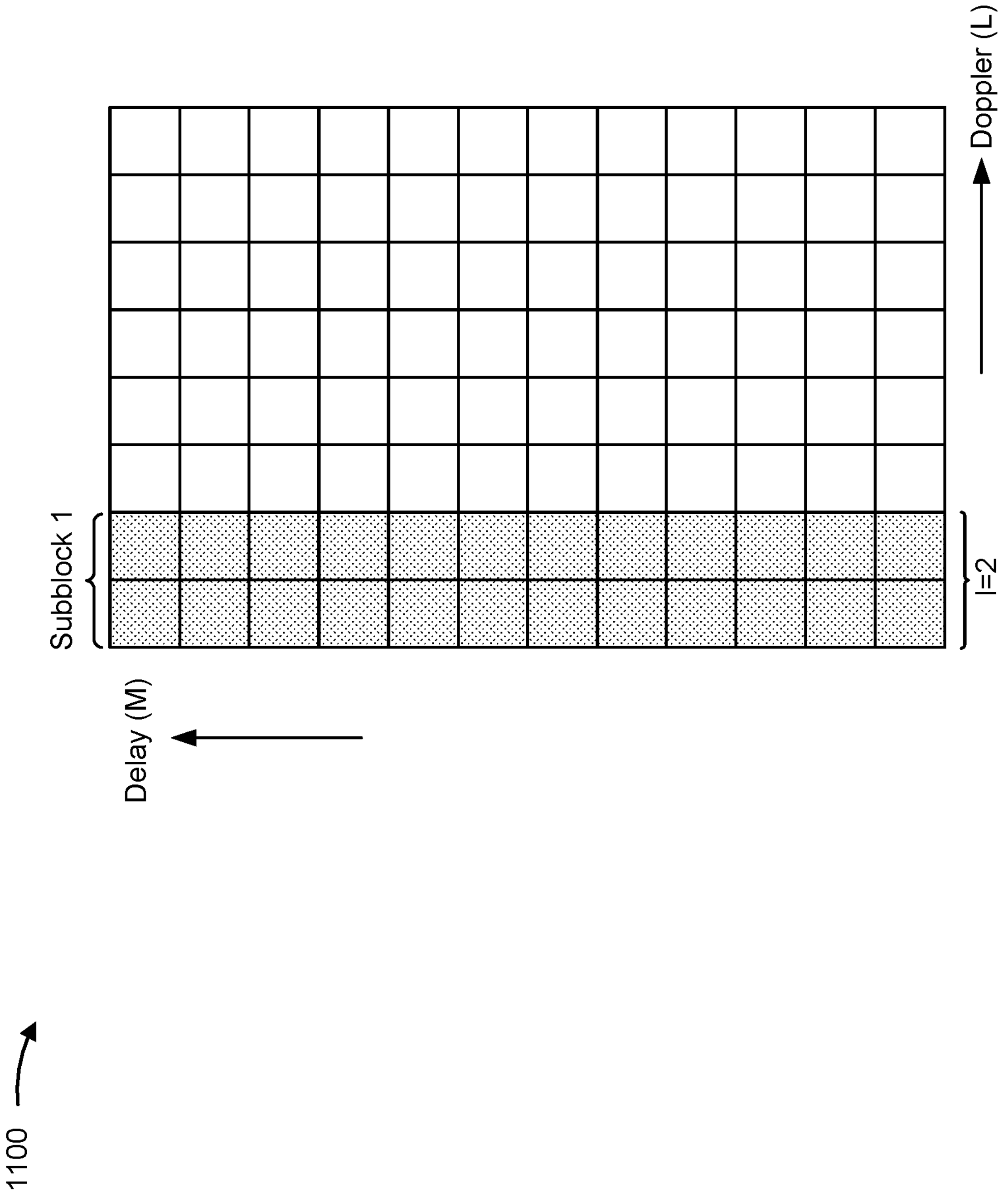

FIG. 11 is a diagram illustrating an example 1100 associated with OTFS-IM using a selection of subblocks.

As shown in FIG. 11, delay resources corresponding to multiple Doppler resources (e.g., all of the delay resources corresponding to multiple Doppler resources) may be selected as a subblock. In this case, a subblock may have a subblock size of lM, where l is the number of Doppler resources in each subblock. For example, delay resources corresponding to two Doppler resources (l=2) may be selected as a subblock. In each subblock, only k resources may be selected to be non-zeroes, and the remaining (L−k) resources may be kept empty.

As indicated above, FIG. 11 is provided as an example. Other examples may differ from what is described with regard to FIG. 11.

Figure 12:
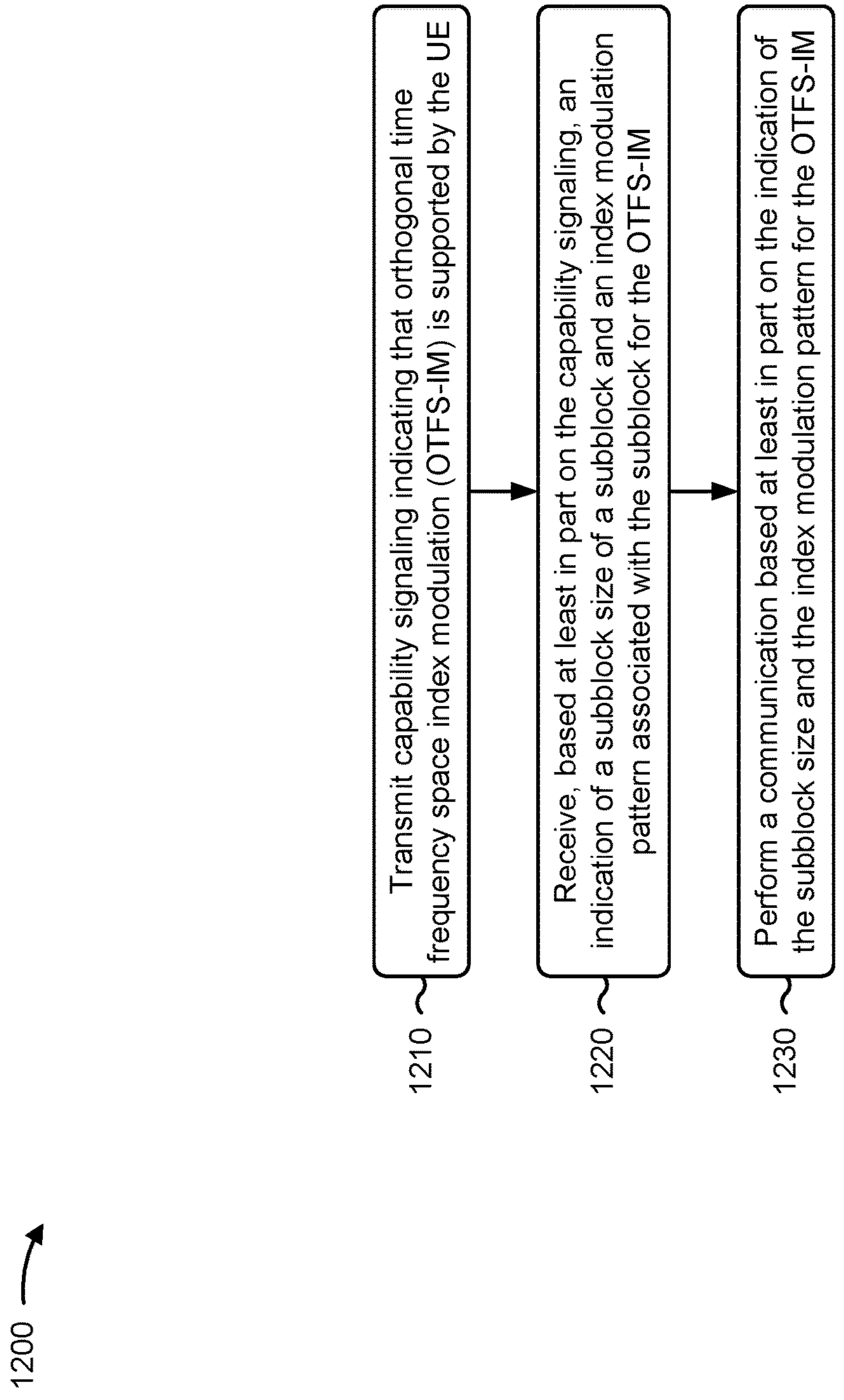
FIGS. 12-13 are diagrams illustrating example processes associated with OTFS-IM using a selection of subblocks, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with OTFS-IM using a selection of subblocks.

As shown in FIG. 12, in some aspects, process 1200 may include transmitting capability signaling indicating that OTFS-IM is supported by the UE (block 1210). For example, the UE (e.g., using transmission component 1404 and/or communication manager 1406, depicted in FIG. 14) may transmit capability signaling indicating that OTFS-IM is supported by the UE, as described above, for example, with reference to FIGS. 7-11.

As further shown in FIG. 12, in some aspects, process 1200 may include receiving, based at least in part on the capability signaling, an indication of a subblock size of a subblock and an index modulation pattern associated with the subblock for the OTFS-IM (block 1220). For example, the UE (e.g., using reception component 1402 and/or communication manager 1406, depicted in FIG. 14) may receive, based at least in part on the capability signaling, an indication of a subblock size of a subblock and an index modulation pattern associated with the subblock for the OTFS-IM, as described above, for example, with reference to FIGS. 7-11.

As further shown in FIG. 12, in some aspects, process 1200 may include performing a communication based at least in part on the indication of the subblock size and the index modulation pattern for the OTFS-IM (block 1230). For example, the UE (e.g., using communication manager 1406, depicted in FIG. 14) may perform a communication based at least in part on the indication of the subblock size and the index modulation pattern for the OTFS-IM, as described above, for example, with reference to FIGS. 7-11.

Process 1200 may include additional aspects, such as any single aspect or any combination of aspects described below and/or in connection with one or more other processes described elsewhere herein.

In a first aspect, process 1200 includes receiving an OTFS-IM waveform based at least in part on the indication of the subblock size and the index modulation pattern for OTFS-IM, the OTFS-IM being detectable by the UE based at least in part on the indication of the subblock size and the index modulation pattern for OTFS-IM.

In a second aspect, alone or in combination with the first aspect, process 1200 includes transmitting an OTFS-IM waveform based at least in part on the indication of the subblock size and the index modulation pattern for OTFS-IM.

In a third aspect, alone or in combination with one or more of the first and second aspects, the subblock size and the index modulation pattern are based at least in part on one or more of a PAPR requirement or a data requirement.

In a fourth aspect, alone or in combination with one or more of the first through third aspects, the subblock is associated with a delay dimension and a Doppler dimension, and the index modulation pattern indicates a non-zero pattern associated with the subblock.

In a fifth aspect, alone or in combination with one or more of the first through fourth aspects, the capability signaling indicates a maximum subblock size supported by the UE.

In a sixth aspect, alone or in combination with one or more of the first through fifth aspects, the subblock size is based at least in part on a modulation order.

In a seventh aspect, alone or in combination with one or more of the first through sixth aspects, the subblock size is a data subblock size and the index modulation pattern is a data index modulation pattern, wherein the indication of the subblock size and the index modulation pattern is received via a reference signal, wherein the reference signal is based at least in part on a reference signal subblock size and a reference signal index modulation pattern, and an indication of the reference signal subblock size and the reference signal index modulation pattern is stored by the UE and used to detect the reference signal.

In an eighth aspect, alone or in combination with one or more of the first through seventh aspects, the subblock is selected based at least in part on a Doppler dimension, wherein a plurality of Doppler resources corresponding to a delay is selected as the subblock, and a quantity of resources in the subblock are selected to be non-zero and remaining resources in the subblock are selected to be zero.

In a ninth aspect, alone or in combination with one or more of the first through eighth aspects, one of the plurality of Doppler resources corresponding to the delay is selected to be non-zero.

In a tenth aspect, alone or in combination with one or more of the first through ninth aspects, the subblock is selected based at least in part on a plurality of Doppler resources corresponding to multiple delays, and a quantity of resources in the subblock are selected to be non-zero and remaining resources in the subblock are selected to be zero.

In an eleventh aspect, alone or in combination with one or more of the first through tenth aspects, the subblock is selected based at least in part on a plurality of delay resources corresponding to multiple Doppler resources, and a quantity of resources in the subblock are selected to be non-zero and remaining resources in the subblock are selected to be zero.

In a twelfth aspect, alone or in combination with one or more of the first through eleventh aspects, a quantity of non-zero resources varies across different subblocks.

In a thirteenth aspect, alone or in combination with one or more of the first through twelfth aspects, zero resources in the subblock are replaceable with a non-zero constellation, wherein the non-zero constellation is different from a constellation used for non-zero resources in the subblock.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
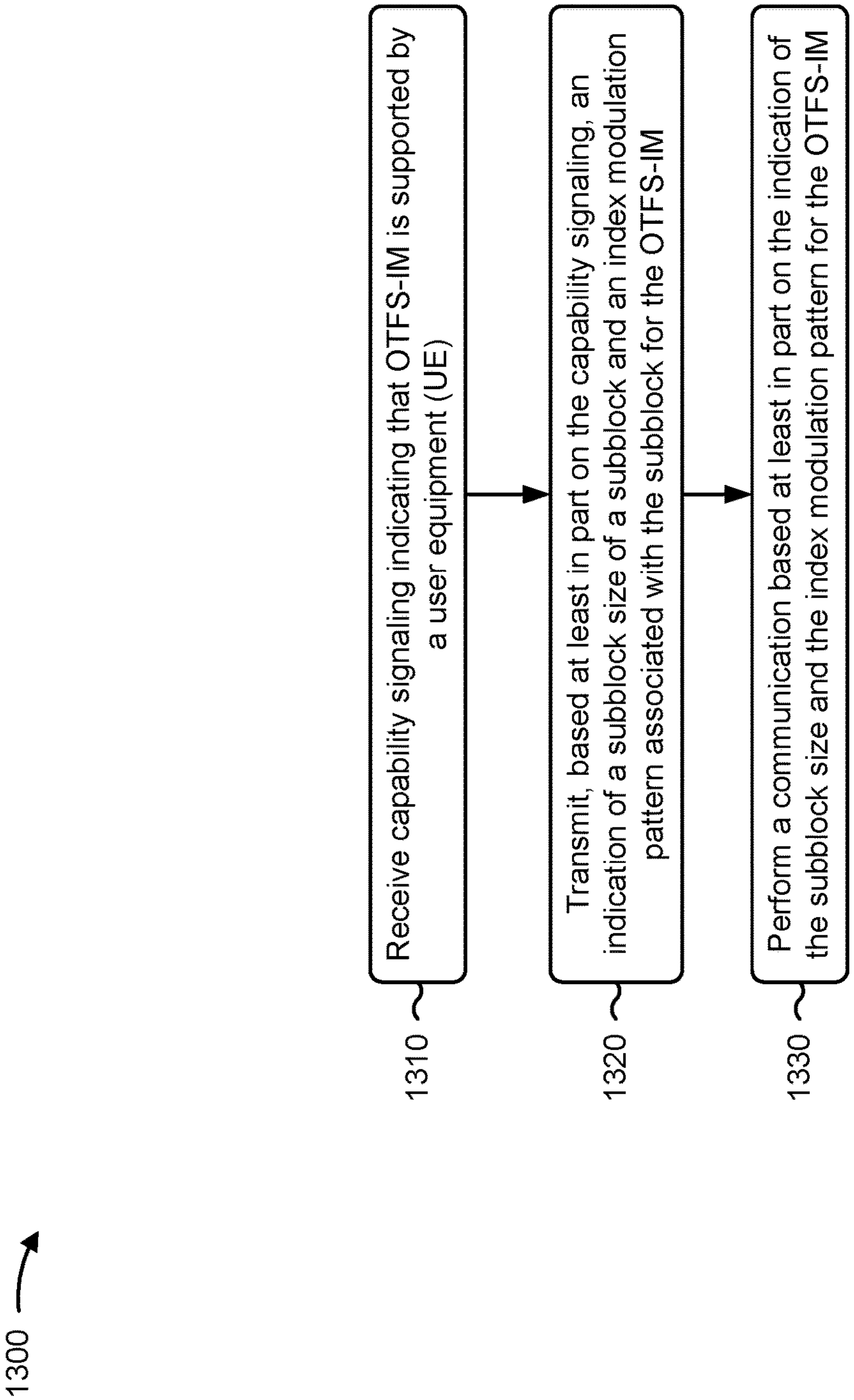

FIG. 13 is a diagram illustrating an example process 1300 performed, for example, by a network node, in accordance with the present disclosure. Example process 1300 is an example where the network node (e.g., network node 110) performs operations associated with OTFS-IM using a selection of subblocks.

As shown in FIG. 13, in some aspects, process 1300 may include receiving capability signaling indicating that OTFS-IM is supported by a UE (block 1310). For example, the network node (e.g., using reception component 1502 and/or communication manager 1506, depicted in FIG. 15) may receive capability signaling indicating that OTFS-IM is supported by a UE, as described above, for example, with reference to FIGS. 7-11.

As further shown in FIG. 13, in some aspects, process 1300 may include transmitting, based at least in part on the capability signaling, an indication of a subblock size of a subblock and an index modulation pattern associated with the subblock for the OTFS-IM (block 1320). For example, the network node (e.g., using transmission component 1504 and/or communication manager 1506, depicted in FIG. 15) may transmit, based at least in part on the capability signaling, an indication of a subblock size of a subblock and an index modulation pattern associated with the subblock for the OTFS-IM, as described above, for example, with reference to FIGS. 7-11.

As further shown in FIG. 13, in some aspects, process 1300 may include performing a communication based at least in part on the indication of the subblock size and the index modulation pattern for the OTFS-IM (block 1330). For example, the network node (e.g., using communication manager 1506, depicted in FIG. 15) may perform a communication based at least in part on the indication of the subblock size and the index modulation pattern for the OTFS-IM, as described above, for example, with reference to FIGS. 7-11.

Process 1300 may include additional aspects, such as any single aspect or any combination of aspects described below and/or in connection with one or more other processes described elsewhere herein.

In a first aspect, process 1300 transmitting an OTFS-IM waveform based at least in part on the indication of the subblock size and the index modulation pattern for OTFS-IM.

In a second aspect, alone or in combination with the first aspect, process 1300 includes receiving an OTFS-IM waveform based at least in part on the indication of the subblock size and the index modulation pattern for OTFS-IM.

In a third aspect, alone or in combination with one or more of the first and second aspects, the subblock size and the index modulation pattern are based at least in part on one or more of a PAPR requirement or a data requirement.

In a fourth aspect, alone or in combination with one or more of the first through third aspects, the subblock is associated with a delay dimension and a Doppler dimension, and the index modulation pattern indicates a non-zero pattern associated with the subblock.

In a fifth aspect, alone or in combination with one or more of the first through fourth aspects, the capability signaling indicates a maximum subblock size supported by the UE.

In a sixth aspect, alone or in combination with one or more of the first through fifth aspects, the subblock size is based at least in part on a modulation order.

In a seventh aspect, alone or in combination with one or more of the first through sixth aspects, the subblock size is a data subblock size and the index modulation pattern is a data index modulation pattern, wherein the indication of the subblock size and the index modulation pattern is transmitted via a reference signal, and the reference signal is based at least in part on a reference signal subblock size and a reference signal index modulation pattern.

In an eighth aspect, alone or in combination with one or more of the first through seventh aspects, the subblock is selected based at least in part on a Doppler dimension, wherein a plurality of Doppler resources corresponding to a delay is selected as the subblock, and a quantity of resources in the subblock are selected to be non-zero and remaining resources in the subblock are selected to be zero.

In a ninth aspect, alone or in combination with one or more of the first through eighth aspects, one of the plurality of Doppler resources corresponding to the delay is selected to be non-zero.

In a tenth aspect, alone or in combination with one or more of the first through ninth aspects, the subblock is selected based at least in part on a plurality of Doppler resources corresponding to multiple delays, and a quantity of resources in the subblock are selected to be non-zero and remaining resources in the subblock are selected to be zero.

In an eleventh aspect, alone or in combination with one or more of the first through tenth aspects, the subblock is selected based at least in part on a plurality of delay resources corresponding to multiple Doppler resources, and a quantity of resources in the subblock are selected to be non-zero and remaining resources in the subblock are selected to be zero.

In a twelfth aspect, alone or in combination with one or more of the first through eleventh aspects, a quantity of non-zero resources varies across different subblocks.

In a thirteenth aspect, alone or in combination with one or more of the first through twelfth aspects, zero resources in the subblock are replaceable with a non-zero constellation, wherein the non-zero constellation is different from a constellation used for non-zero resources in the subblock.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
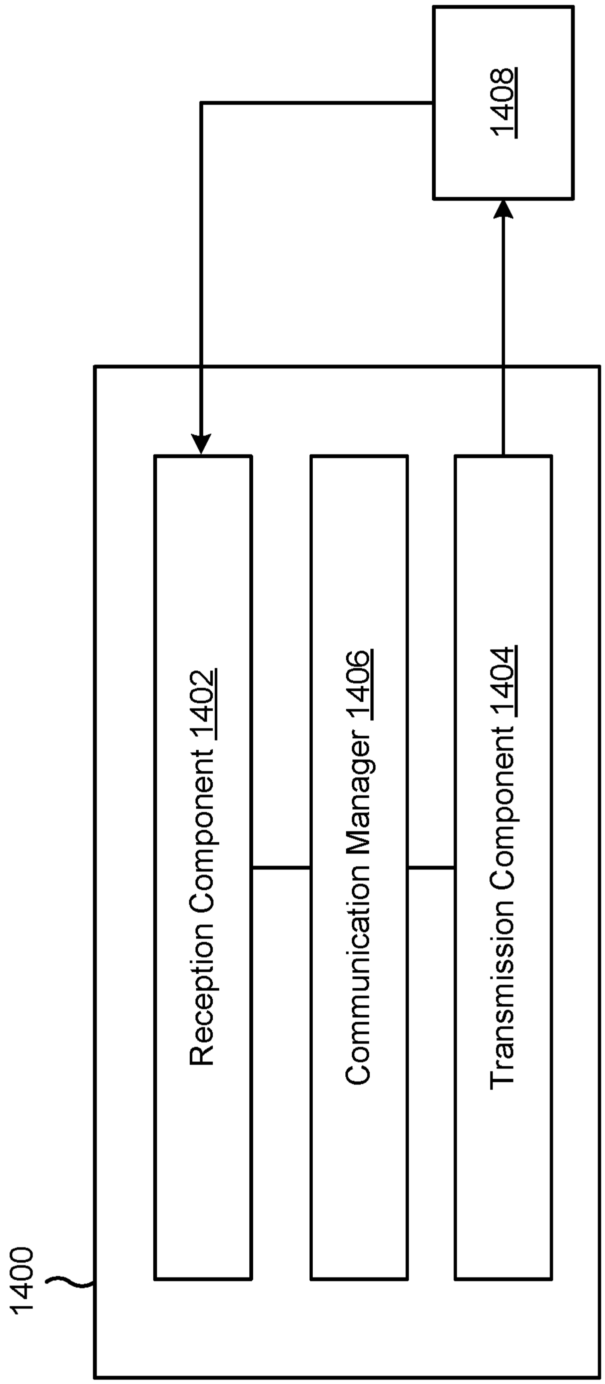
FIGS. 14-15 are diagrams of example apparatuses for wireless communication, in accordance with the present disclosure.

FIG. 14 is a diagram of an example apparatus 1400 for wireless communication, in accordance with the present disclosure. The apparatus 1400 may be a UE, or a UE may include the apparatus 1400. In some aspects, the apparatus 1400 includes a reception component 1402, a transmission component 1404, and/or a communication manager 1406, which may be in communication with one another (for example, via one or more buses and/or one or more other components). In some aspects, the communication manager 1406 is the communication manager 140 described in connection with FIG. 1. As shown, the apparatus 1400 may communicate with another apparatus 1408, such as a UE or a network node (such as a CU, a DU, an RU, or a base station), using the reception component 1402 and the transmission component 1404.

In some aspects, the apparatus 1400 may be configured to perform one or more operations described herein in connection with FIGS. 7-11. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The communication manager 1406 may support operations of the reception component 1402 and/or the transmission component 1404. For example, the communication manager 1406 may receive information associated with configuring reception of communications by the reception component 1402 and/or transmission of communications by the transmission component 1404. Additionally, or alternatively, the communication manager 1406 may generate and/or provide control information to the reception component 1402 and/or the transmission component 1404 to control reception and/or transmission of communications.

The transmission component 1404 may transmit capability signaling indicating that OTFS-IM is supported by the UE. The reception component 1402 may receive, based at least in part on the capability signaling, an indication of a subblock size of a subblock and an index modulation pattern associated with the subblock for the OTFS-IM. The communication manager 1406 may perform a communication based at least in part on the indication of the subblock size and the index modulation pattern for the OTFS-IM.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
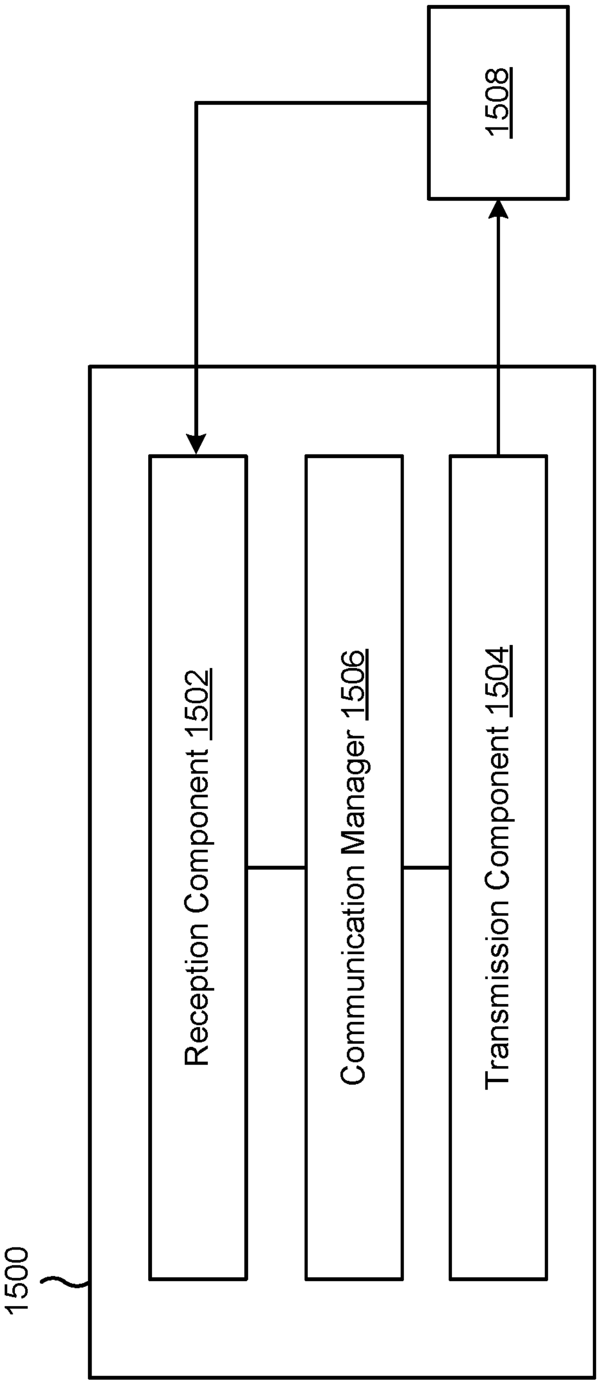

FIG. 15 is a diagram of an example apparatus 1500 for wireless communication, in accordance with the present disclosure. The apparatus 1500 may be a network node, or a network node may include the apparatus 1500. In some aspects, the apparatus 1500 includes a reception component 1502, a transmission component 1504, and/or a communication manager 1506, which may be in communication with one another (for example, via one or more buses and/or one or more other components). In some aspects, the communication manager 1506 is the communication manager 150 described in connection with FIG. 1. As shown, the apparatus 1500 may communicate with another apparatus 1508, such as a UE or a network node (such as a CU, a DU, an RU, or a base station), using the reception component 1502 and the transmission component 1504.

In some aspects, the apparatus 1500 may be configured to perform one or more operations described herein in connection with FIGS. 7-11. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the network node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1508. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network node described in connection with FIG. 2. In some aspects, the reception component 1502 and/or the transmission component 1504 may include or may be included in a network interface. The network interface may be configured to obtain and/or output signals for the apparatus 1500 via one or more communications links, such as a backhaul link, a midhaul link, and/or a fronthaul link.

The transmission component 1504 may transmit communications, such as reference signals, control information, data communications, or a combination thereof, to the apparatus 1508. In some aspects, one or more other components of the apparatus 1500 may generate communications and may provide the generated communications to the transmission component 1504 for transmission to the apparatus 1508. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1504 may include one or more antennas, a modem, a modulator, a transmit MIMO processor, a transmit processor, a controller/processor, a memory, or a combination thereof, of the network node described in connection with FIG. 2. In some aspects, the transmission component 1504 may be co-located with the reception component 1502 in a transceiver.

The communication manager 1506 may support operations of the reception component 1502 and/or the transmission component 1504. For example, the communication manager 1506 may receive information associated with configuring reception of communications by the reception component 1502 and/or transmission of communications by the transmission component 1504. Additionally, or alternatively, the communication manager 1506 may generate and/or provide control information to the reception component 1502 and/or the transmission component 1504 to control reception and/or transmission of communications.

The reception component 1502 may receive capability signaling indicating that OTFS-IM is supported by a UE. The transmission component 1504 may transmit, based at least in part on the capability signaling, an indication of a subblock size of a subblock and an index modulation pattern associated with the subblock for the OTFS-IM. The communication manager 1506 may perform a communication based at least in part on the indication of the subblock size and the index modulation pattern for the OTFS-IM.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: transmitting capability signaling indicating that orthogonal time frequency space index modulation (OTFS-IM) is supported by the UE; receiving, based at least in part on the capability signaling, an indication of a subblock size of a subblock and an index modulation pattern associated with the subblock for the OTFS-IM; and performing a communication based at least in part on the indication of the subblock size and the index modulation pattern for the OTFS-IM.

Aspect 2: The method of Aspect 1, wherein performing the communication further comprises: receiving an OTFS-IM waveform based at least in part on the indication of the subblock size and the index modulation pattern for OTFS-IM, the OTFS-IM being detectable by the UE based at least in part on the indication of the subblock size and the index modulation pattern for OTFS-IM.

Aspect 3: The method of any of Aspects 1-2, wherein performing the communication further comprises: transmitting an OTFS-IM waveform based at least in part on the indication of the subblock size and the index modulation pattern for OTFS-IM.

Aspect 4: The method of any of Aspects 1-3, wherein the subblock size and the index modulation pattern are based at least in part on one or more of: a peak-to-average power ratio (PAPR) requirement or a data requirement.

Aspect 5: The method of any of Aspects 1-4, wherein the subblock is associated with a delay dimension and a Doppler dimension, and wherein the index modulation pattern indicates a non-zero pattern associated with the subblock.

Aspect 6: The method of any of Aspects 1-5, wherein the capability signaling indicates a maximum subblock size supported by the UE.

Aspect 7: The method of any of Aspects 1-6, wherein the subblock size is based at least in part on a modulation order.

Aspect 8: The method of any of Aspects 1-7, wherein the subblock size is a data subblock size and the index modulation pattern is a data index modulation pattern, wherein the indication of the subblock size and the index modulation pattern is received via a reference signal, wherein the reference signal is based at least in part on a reference signal subblock size and a reference signal index modulation pattern, and wherein an indication of the reference signal subblock size and the reference signal index modulation pattern is stored by the UE and used to detect the reference signal.

Aspect 9: The method of any of Aspects 1-8, wherein the subblock is selected based at least in part on a Doppler dimension, wherein a plurality of Doppler resources corresponding to a delay is selected as the subblock, and wherein a quantity of resources in the subblock are selected to be non-zero and remaining resources in the subblock are selected to be zero.

Aspect 10: The method of Aspect 9, wherein one of the plurality of Doppler resources corresponding to the delay is selected to be non-zero.

Aspect 11: The method of any of Aspects 1-10, wherein the subblock is selected based at least in part on a plurality of Doppler resources corresponding to multiple delays, and wherein a quantity of resources in the subblock are selected to be non-zero and remaining resources in the subblock are selected to be zero.

Aspect 12: The method of any of Aspects 1-11, wherein the subblock is selected based at least in part on a plurality of delay resources corresponding to multiple Doppler resources, and wherein a quantity of resources in the subblock are selected to be non-zero and remaining resources in the subblock are selected to be zero.

Aspect 13: The method of any of Aspects 1-12, wherein a quantity of non-zero resources varies across different subblocks.

Aspect 14: The method of any of Aspects 1-13, wherein zero resources in the subblock are replaceable with a non-zero constellation, wherein the non-zero constellation is different from a constellation used for non-zero resources in the subblock.

Aspect 15: A method of wireless communication performed by a network node, comprising: receiving capability signaling indicating that orthogonal time frequency space index modulation (OTFS-IM) is supported by a user equipment (UE); transmitting, based at least in part on the capability signaling, an indication of a subblock size of a subblock and an index modulation pattern associated with the subblock for the OTFS-IM; and performing a communication based at least in part on the indication of the subblock size and the index modulation pattern for the OTFS-IM.

Aspect 16: The method of Aspect 15, wherein performing the communication further comprises: transmitting an OTFS-IM waveform based at least in part on the indication of the subblock size and the index modulation pattern for OTFS-IM.

Aspect 17: The method of any of Aspects 15-16, wherein performing the communication further comprises: receiving an OTFS-IM waveform based at least in part on the indication of the subblock size and the index modulation pattern for OTFS-IM.

Aspect 18: The method of any of Aspects 15-17, wherein the subblock size and the index modulation pattern are based at least in part on one or more of: a peak-to-average power ratio (PAPR) requirement or a data requirement.

Aspect 19: The method of any of Aspects 15-18, wherein the subblock is associated with a delay dimension and a Doppler dimension, and wherein the index modulation pattern indicates a non-zero pattern associated with the subblock.

Aspect 20: The method of any of Aspects 15-19, wherein the capability signaling indicates a maximum subblock size supported by the UE.

Aspect 21: The method of any of Aspects 15-20, wherein the subblock size is based at least in part on a modulation order.

Aspect 22: The method of any of Aspects 15-21, wherein the subblock size is a data subblock size and the index modulation pattern is a data index modulation pattern, wherein the indication of the subblock size and the index modulation pattern is transmitted via a reference signal, and wherein the reference signal is based at least in part on a reference signal subblock size and a reference signal index modulation pattern.

Aspect 23: The method of any of Aspects 15-22, wherein the subblock is selected based at least in part on a Doppler dimension, wherein a plurality of Doppler resources corresponding to a delay is selected as the subblock, and wherein a quantity of resources in the subblock are selected to be non-zero and remaining resources in the subblock are selected to be zero.

Aspect 24: The method of Aspect 23, wherein one of the plurality of Doppler resources corresponding to the delay is selected to be non-zero.

Aspect 25: The method of any of Aspects 15-24, wherein the subblock is selected based at least in part on a plurality of Doppler resources corresponding to multiple delays, and wherein a quantity of resources in the subblock are selected to be non-zero and remaining resources in the subblock are selected to be zero.

Aspect 26: The method of any of Aspects 15-25, wherein the subblock is selected based at least in part on a plurality of delay resources corresponding to multiple Doppler resources, and wherein a quantity of resources in the subblock are selected to be non-zero and remaining resources in the subblock are selected to be zero.

Aspect 27: The method of any of Aspects 15-26, wherein a quantity of non-zero resources varies across different subblocks.

Aspect 28: The method of any of Aspects 15-27, wherein zero resources in the subblock are replaceable with a non-zero constellation, wherein the non-zero constellation is different from a constellation used for non-zero resources in the subblock.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a “processor” is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, “satisfying a threshold” may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

a memory; and one or more processors, coupled to the memory, configured to:

transmit capability signaling indicating that orthogonal time frequency space index modulation (OTFS-IM) is supported by the UE;

receive, based at least in part on the capability signaling, an indication of a subblock size of a subblock and an index modulation pattern associated with the subblock for the OTFS-IM, wherein the subblock is associated with a delay dimension and a Doppler dimension, wherein the index modulation pattern indicates a non-zero pattern associated with the subblock, and wherein the subblock and the index modulation pattern are selected in delay-Doppler domain based at least in part on a peak-to-average power ratio (PAPR) requirement; and perform a communication, using the subblock, based at least in part on the indication of the subblock size and the index modulation pattern for the OTFS-IM.

2. The apparatus of claim 1, wherein the one or more processors, to perform the communication, are configured to:

receive an OTFS-IM waveform based at least in part on the indication of the subblock size and the index modulation pattern for OTFS-IM, the OTFS-IM being detectable by the UE based at least in part on the indication of the subblock size and the index modulation pattern for OTFS-IM.

3. The apparatus of claim 1, wherein the one or more processors, to perform the communication, are configured to:

transmit an OTFS-IM waveform based at least in part on the indication of the subblock size and the index modulation pattern for OTFS-IM.

4. The apparatus of claim 1, wherein the subblock size and the index modulation pattern are based at least in part on a data requirement.

5. The apparatus of claim 1, wherein the capability signaling indicates a maximum subblock size supported by the UE.

6. The apparatus of claim 1, wherein the subblock size is a data subblock size and the index modulation pattern is a data index modulation pattern, wherein the indication of the subblock size and the index modulation pattern is received via a reference signal, wherein the reference signal is based at least in part on a reference signal subblock size and a reference signal index modulation pattern, and wherein an indication of the reference signal subblock size and the reference signal index modulation pattern is stored by the UE and used to detect the reference signal.

7. The apparatus of claim 1, wherein the subblock is selected based at least in part on a Doppler dimension, wherein a plurality of Doppler resources corresponding to a delay is selected as the subblock, wherein a quantity of resources in the subblock are selected to be non-zero and remaining resources in the subblock are selected to be zero, and wherein one of the plurality of Doppler resources corresponding to the delay is selected to be non-zero.

8. The apparatus of claim 1, wherein the subblock is selected based at least in part on a plurality of Doppler resources corresponding to multiple delays, and wherein a quantity of resources in the subblock are selected to be non-zero and remaining resources in the subblock are selected to be zero.

9. The apparatus of claim 1, wherein the subblock is selected based at least in part on a plurality of delay resources corresponding to multiple Doppler resources, and wherein a quantity of resources in the subblock are selected to be non-zero and remaining resources in the subblock are selected to be zero.

10. The apparatus of claim 1, wherein a quantity of non-zero resources varies across different subblocks.

11. The apparatus of claim 1, wherein zero resources in the subblock are replaceable with a non-zero constellation, wherein the non-zero constellation is different from a constellation used for non-zero resources in the subblock.

12. An apparatus for wireless communication at a network node, comprising:

a memory; and one or more processors, coupled to the memory, configured to:

receive capability signaling indicating that orthogonal time frequency space index modulation (OTFS-IM) is supported by a user equipment (UE);

transmit, based at least in part on the capability signaling, an indication of a subblock size of a subblock and an index modulation pattern associated with the subblock for the OTFS-IM, wherein the subblock is associated with a delay dimension and a Doppler dimension, wherein the index modulation pattern indicates a non-zero pattern associated with the subblock, and wherein the subblock and the index modulation pattern are selected in delay-Doppler domain based at least in part on a peak-to-average power ratio (PAPR) requirement; and perform a communication, using the subblock, based at least in part on the indication of the subblock size and the index modulation pattern for the OTFS-IM.

13. The apparatus of claim 12, wherein the one or more processors, to perform the communication, are configured to:

transmit an OTFS-IM waveform based at least in part on the indication of the subblock size and the index modulation pattern for OTFS-IM.

14. The apparatus of claim 12, wherein the one or more processors, to perform the communication, are configured to:

receive an OTFS-IM waveform based at least in part on the indication of the subblock size and the index modulation pattern for OTFS-IM.

15. The apparatus of claim 12, wherein the subblock size and the index modulation pattern are based at least in part on a data requirement.

16. The apparatus of claim 12, wherein the capability signaling indicates a maximum subblock size supported by the UE.

17. The apparatus of claim 12, wherein the subblock size is a data subblock size and the index modulation pattern is a data index modulation pattern, wherein the indication of the subblock size and the index modulation pattern is transmitted via a reference signal, and wherein the reference signal is based at least in part on a reference signal subblock size and a reference signal index modulation pattern.

18. The apparatus of claim 12, wherein the subblock is selected based at least in part on a Doppler dimension, wherein a plurality of Doppler resources corresponding to a delay is selected as the subblock, wherein a quantity of resources in the subblock are selected to be non-zero and remaining resources in the subblock are selected to be zero, and wherein one of the plurality of Doppler resources corresponding to the delay is selected to be non-zero.

19. The apparatus of claim 12, wherein the subblock is selected based at least in part on a plurality of Doppler resources corresponding to multiple delays, and wherein a quantity of resources in the subblock are selected to be non-zero and remaining resources in the subblock are selected to be zero.

20. The apparatus of claim 12, wherein the subblock is selected based at least in part on a plurality of delay resources corresponding to multiple Doppler resources, and wherein a quantity of resources in the subblock are selected to be non-zero and remaining resources in the subblock are selected to be zero.

21. The apparatus of claim 12, wherein a quantity of non-zero resources varies across different subblocks.

22. The apparatus of claim 12, wherein zero resources in the subblock are replaceable with a non-zero constellation, wherein the non-zero constellation is different from a constellation used for non-zero resources in the subblock.

23. A method of wireless communication performed by a user equipment (UE), comprising:

transmitting capability signaling indicating that orthogonal time frequency space index modulation (OTFS-IM) is supported by the UE;

receiving, based at least in part on the capability signaling, an indication of a subblock size of a subblock and an index modulation pattern associated with the subblock for the OTFS-IM, wherein the subblock is associated with a delay dimension and a Doppler dimension, wherein the index modulation pattern indicates a non-zero pattern associated with the subblock, and wherein the subblock and the index modulation pattern are selected in delay-Doppler domain based at least in part on a peak-to-average power ratio (PAPR) requirement; and performing a communication, using the subblock, based at least in part on the indication of the subblock size and the index modulation pattern for the OTFS-IM.

24. The method of claim 23, wherein performing the communication further comprises:

receiving an OTFS-IM waveform based at least in part on the indication of the subblock size and the index modulation pattern for OTFS-IM, the OTFS-IM being detectable by the UE based at least in part on the indication of the subblock size and the index modulation pattern for OTFS-IM; or transmitting an OTFS-IM waveform based at least in part on the indication of the subblock size and the index modulation pattern for OTFS-IM.

25. The method of claim 23, wherein:

the subblock is selected based at least in part on a Doppler dimension, wherein a plurality of Doppler resources corresponding to a delay is selected as the subblock, and wherein a quantity of resources in the subblock are selected to be non-zero and remaining resources in the subblock are selected to be zero;

the subblock is selected based at least in part on a plurality of Doppler resources corresponding to multiple delays, and wherein a quantity of resources in the subblock are selected to be non-zero and remaining resources in the subblock are selected to be zero; or the subblock is selected based at least in part on a plurality of delay resources corresponding to multiple Doppler resources, and wherein a quantity of resources in the subblock are selected to be non-zero and remaining resources in the subblock are selected to be zero.

26. The method of claim 23, wherein the subblock and the index modulation pattern are selected based at least in part on a data requirement.

27. A method of wireless communication performed by a network node, comprising:

receiving capability signaling indicating that orthogonal time frequency space index modulation (OTFS-IM) is supported by a user equipment (UE);

transmitting, based at least in part on the capability signaling, an indication of a subblock size of a subblock and an index modulation pattern associated with the subblock for the OTFS-IM, wherein the subblock is associated with a delay dimension and a Doppler dimension, wherein the index modulation pattern indicates a non-zero pattern associated with the subblock, and wherein the subblock and the index modulation pattern are selected in delay-Doppler domain based at least in part on a peak-to-average power ratio (PAPR) requirement; and performing a communication, using the subblock, based at least in part on the indication of the subblock size and the index modulation pattern for the OTFS-IM.

28. The method of claim 27, wherein performing the communication further comprises:

transmitting an OTFS-IM waveform based at least in part on the indication of the subblock size and the index modulation pattern for OTFS-IM; or receiving an OTFS-IM waveform based at least in part on the indication of the subblock size and the index modulation pattern for OTFS-IM.

29. The method of claim 27, wherein:

the subblock is selected based at least in part on a Doppler dimension, wherein a plurality of Doppler resources corresponding to a delay is selected as the subblock, and wherein a quantity of resources in the subblock are selected to be non-zero and remaining resources in the subblock are selected to be zero;

the subblock is selected based at least in part on a plurality of Doppler resources corresponding to multiple delays, and wherein a quantity of resources in the subblock are selected to be non-zero and remaining resources in the subblock are selected to be zero; or the subblock is selected based at least in part on a plurality of delay resources corresponding to multiple Doppler resources, and wherein a quantity of resources in the subblock are selected to be non-zero and remaining resources in the subblock are selected to be zero.

30. The method of claim 27, wherein the subblock and the index modulation pattern are selected based at least in part on a data requirement.

* * * * *